US012764766B2

(12) United States Patent
Zeng et al.

(10) Patent No.: US 12,764,766 B2
(45) Date of Patent: Oct. 13, 2026

(54) SIDELINK FEEDBACK RESOURCE CONFIGURATION METHOD, INFORMATION PROCESSING METHOD, AND DEVICE

(71) Applicant: VIVO MOBILE COMMUNICATION CO., LTD., Dongguan (CN)

(72) Inventors: Yu Zeng, Dongguan (CN); Zichao Ji, Dongguan (CN); Siqi Liu, Dongguan (CN); Shixiao Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 675 days.

(21) Appl. No.: 18/092,887

(22) Filed: Jan. 3, 2023

(65) Prior Publication Data

US 2023/0146547 A1 May 11, 2023

Related U.S. Application Data

(63) Continuation of application No. PCT/CN2021/104304, filed on Jul. 2, 2021.

(30) Foreign Application Priority Data

Jul. 3, 2020 (CN) ......................... 202010631924.7

(51) Int. Cl.
*H04W 72/40* (2023.01)
*H04L 5/00* (2006.01)
*H04W 72/044* (2023.01)

(52) U.S. Cl.
CPC ........... *H04W 72/40* (2023.01); *H04L 5/0055* (2013.01); *H04W 72/044* (2013.01)

(58) Field of Classification Search
CPC ... H04W 72/40; H04W 72/044; H04W 72/25; H04W 92/18; H04W 76/14; H04W 72/53;
(Continued)

(56) References Cited

U.S. PATENT DOCUMENTS

2018/0054237 A1 2/2018 Tseng et al.
2020/0205166 A1 6/2020 Huang et al.
(Continued)

FOREIGN PATENT DOCUMENTS

CN 110311762 A 10/2019
CN 110445586 A 11/2019
(Continued)

OTHER PUBLICATIONS

CMCC: "Discussion on sidelink resource allocation mechanism", 3GPP Draft; R1-1906515, May 2019 (Year: 2019).*
(Continued)

*Primary Examiner* — Mang Hang Yeung
(74) *Attorney, Agent, or Firm* — IPX PLLC

(57) ABSTRACT

A sidelink feedback resource configuration method, an information processing method, and a device are provided. The sidelink feedback resource configuration method includes: obtaining resource configuration information; and determining, based on the resource configuration information, a sidelink feedback resource corresponding to a target mapping mode, where the target mapping mode is one of multiple mapping modes corresponding to one resource pool.

20 Claims, 10 Drawing Sheets

(58) Field of Classification Search
CPC .......... H04W 72/0453; H04W 72/0457; H04L 5/0055; H04L 1/1851; H04L 1/1812
USPC .......................................................... 370/330
See application file for complete search history.

(56) References Cited

U.S. PATENT DOCUMENTS

| | | | | |
|---|---|---|---|---|
| 2020/0220669 | A1* | 7/2020 | Park | H04L 1/1861 |
| 2020/0288286 | A1* | 9/2020 | Hwang | H04L 27/2607 |
| 2022/0210768 | A1* | 6/2022 | Zhou | H04W 72/20 |

FOREIGN PATENT DOCUMENTS

| | | | |
|---|---|---|---|
| CN | 110445597 | A | 11/2019 |
| CN | 110545533 | A | 12/2019 |
| CN | 110943809 | A | 3/2020 |
| CN | 111093287 | A | 5/2020 |
| CN | 111278050 | A | 6/2020 |
| CN | 111294175 | A | 6/2020 |
| CN | 111342941 | A | 6/2020 |
| WO | 2020085854 | A1 | 4/2020 |

OTHER PUBLICATIONS

Extended European Search Report issued in related European Application No. 21832005.9, mailed Nov. 16, 2023, 11 pages.
CMCC: "Discussion on sidelink resource allocation mechanism", 3GPP Draft; R1-1906515, May 2019, 4 pages.
Spreadtrum Communications: "Discussion on physical layer procedures for sidelink", 3GPP Draft; R1-1906362, May 2019, 8 pages.
International Search Report issued in corresponding International Application No. PCT/CN2021/104304, mailed Sep. 1, 2021, 8 pages.
First Office Action issued in related Chinese Application No. 202010631924.7, mailed Sep. 19, 2022, 8 pages.
Office Action issued in related Korean Application No. 10-2022-7045098, mailed Mar. 5, 2025, 14 pages.
Samsung, "On Physical Layer Procedures for NR V2X", 3GPP TSG RAN WG1 #99, R1-1912464, Nov. 2019, 15 pages.

* cited by examiner

SIDELINK FEEDBACK RESOURCE CONFIGURATION METHOD, INFORMATION PROCESSING METHOD, AND DEVICE

CROSS-REFERENCE TO RELATED APPLICATIONS

This application is a continuation of International Application No. PCT/CN2021/104304, filed Jul. 2, 2021, which claims priority to Chinese Patent Application No. 202010631924.7, filed Jul. 3, 2020. The entire contents of each of the above-referenced applications are expressly incorporated herein by reference.

TECHNICAL FIELD

This application relates to the field of communications, and in particular, to a sidelink feedback resource configuration method, an information processing method, and a device.

BACKGROUND

At present, a Long Term Evolution (LTE) system supports sidelink (SL) transmission. SL is used for direct data transmission between User Equipment (UE, which may also be referred to as terminal device) without using network devices. Sidelink interface communication for direct communication between UEs is also supported in a New Radio (NR) system that is capable of operating in a working frequency band above 6 GHz not supported by the LTE system and supports a larger operating bandwidth.

The UE transmits Sidelink Control Information (SCI) through a Physical Sidelink Control Channel (PSCCH), and transmits data by scheduling transmission of a Physical Sidelink Shared Channel (PSSCH). Transmission resources may be indicated in the SCI, and the resources are reserved for future transmission. In addition, a Physical Sidelink Feedback Channel (PSFCH) is used to feed back sidelink Hybrid Automatic Repeat Request (HARQ) information. Further, after determining sidelink HARQ information, the UE may transmit the sidelink HARQ information to a network device (for example, a base station) through a Physical Uplink Control Channel (PUCCH) or a Physical Uplink Shared Channel (PUSCH).

Therefore, in the implementation process of this application, the inventors have found that at least the following problems exist in the prior art: the existing sidelink communication cannot be compatible with a variety of different PSFCH feedback timing, and UEs have different understanding on a PSFCH resource configuration, resulting in conflicts of PSFCH resources. Therefore, a receiving end cannot determine from which sending-end UE current sidelink HARQ information comes.

SUMMARY

Embodiments of this application are intended to provide a sidelink feedback resource configuration method, an information processing method, and a device.

According to a first aspect, an embodiment of this application provides a sidelink feedback resource configuration method, applied to a terminal device. The method includes:

obtaining resource configuration information; and determining, based on the resource configuration information, a sidelink feedback resource corresponding to a target mapping mode, where the target mapping mode is one of multiple mapping modes corresponding to one resource pool.

According to a second aspect, an embodiment of this application provides a terminal device, where the terminal device includes:

an obtaining module, configured to obtain resource configuration information; and a determining module, configured to determine, based on the resource configuration information, a sidelink feedback resource corresponding to a target mapping mode, where the target mapping mode is one of multiple mapping modes corresponding to one resource pool.

According to a third aspect, an embodiment of this application provides a sidelink feedback resource configuration method, applied to a communications device. The method includes:

sending resource configuration information to a target terminal device, where the resource configuration information is used for determining, by the target terminal device, a sidelink feedback resource corresponding to a target mapping mode, and the target mapping mode is one of multiple mapping modes corresponding to one resource pool.

According to a fourth aspect, an embodiment of this application provides a communications device, where the communications device includes:

a sending module, configured to send resource configuration information to a target terminal device, where the resource configuration information is used for determining, by the target terminal device, a sidelink feedback resource corresponding to a target mapping mode, and the target mapping mode is one of multiple mapping modes corresponding to one resource pool.

According to a fifth aspect, an embodiment of this application provides an information processing method, applied to a first terminal device. The method includes:

receiving at least one of a resource period or a feedback delay that are corresponding to a target sidelink feedback resource and sent by a second terminal device; and performing at least one of the following operations based on at least one of the resource period or the feedback delay corresponding to the target sidelink feedback resource: determining a mapping mode of the first terminal device; determining a mapping mode of the second terminal device; and scheduling or recommending a resource for the second terminal device.

According to a sixth aspect, an embodiment of this application provides a terminal device, and the terminal device is a first terminal device, including:

a receiving module, configured to receive at least one of a resource period or a feedback delay that are corresponding to a target sidelink feedback resource and sent by a second terminal device; and a processing module, configured to perform at least one of the following operations based on at least one of the resource period or the feedback delay corresponding to the target sidelink feedback resource: determining a mapping mode of the first terminal device; determining a mapping mode of the second terminal device; or scheduling or recommending a sidelink feedback resource for the second terminal device.

According to a seventh aspect, an embodiment of this application provides an information processing method, applied to a second terminal device. The method includes:

sending, to a first terminal device, at least one of a resource period or a feedback delay that are corresponding to a target sidelink feedback resource, where the at least one of the resource period or the feedback delay corresponding to the target sidelink feedback resource is used for performing at least one of the following operations by the first terminal device: determining a mapping mode of the first terminal device; determining a mapping mode of the second terminal device; or scheduling or recommending a resource for the second terminal device.

According to an eighth aspect, an embodiment of this application provides a terminal device, and the terminal device is a second terminal device, including:

a sending module, configured to send, to a first terminal device, at least one of a resource period or a feedback delay that are corresponding to a target sidelink feedback resource, where the at least one of the resource period or the feedback delay corresponding to the target sidelink feedback resource is used for performing at least one of the following operations by the first terminal device: determining a mapping mode of the first terminal device; determining a mapping mode of the second terminal device; or scheduling or recommending a resource for the second terminal device.

According to a ninth aspect, an embodiment of this application provides a terminal device, including a memory, a processor, and a program or instructions stored in the memory and capable of running on the processor, and when the program or instructions are executed by the processor, the steps of the method according to the first aspect, the third aspect, the fifth aspect, or the seventh aspect are implemented.

According to a tenth aspect, an embodiment of this application further provides a network device, including a memory, a processor, and a program or instructions stored in the memory and capable of running on the processor, and when the program or instructions are executed by the processor, the steps of the method according to the third aspect are implemented.

According to an eleventh aspect, an embodiment of this application provides a readable storage medium, where a program or instructions are stored in the readable storage medium. When the program or instructions are executed by a processor, the steps of the method according to the first aspect, the third aspect, the fifth aspect, or the seventh aspect are implemented.

In the embodiments of this application, the terminal device using sidelink may determine, based on the obtained resource configuration information, a sidelink feedback resource corresponding to a target mapping mode required for sidelink feedback, where the target mapping mode is one of the multiple mapping modes corresponding to one resource pool. In this way, according to the embodiments of this application, terminal devices can have consistent understanding on sidelink feedback resource configuration, so as to implement coexistence of mapping modes with different feedback periods, thereby avoiding conflicts of sidelink feedback resources. Further, the terminal devices can support the configuration of multiple mapping modes for one resource pool, and the terminal devices configured with different mapping modes can communicate with each other. In addition, the terminal devices can be also supported to perform sidelink feedback by using a most appropriate feedback period under different communication requirements, so as to achieve the purposes of adjusting communication reliability and feedback delay and implementing power saving. In this way, the terminal device can flexibly adapt to a variety of communication needs.

BRIEF DESCRIPTION OF DRAWINGS

The accompanying drawings described herein are intended for a better understanding of this application, and constitute a part of this application. Exemplary embodiments and descriptions thereof in this application are intended to interpret this application and do not constitute any improper limitation on this application. In the accompanying drawings.

DETAILED DESCRIPTION

The following clearly describes the technical solutions in the embodiments of this application with reference to the accompanying drawings in the embodiments of this application. Apparently, the described embodiments are merely some rather than all of the embodiments of this application.

All other embodiments obtained by a person of ordinary skill in the art based on the embodiments of this application without creative efforts shall fall within the protection scope of this application.

The terms "first", "second", and the like in this specification and claims of this application are used to distinguish between similar objects rather than to describe a specific order or sequence. It should be understood that data used in this way is interchangeable in appropriate circumstances so that the embodiments of this application can be implemented in other orders than the order illustrated or described herein. In addition, in this specification and claims, "and/or" indicates at least one of connected objects, and the character "/" generally indicates an "or" relationship between associated objects.

The technical solutions of this application may be applied to various communications systems, for example, a Global System of Mobile (GSM) communication, a Code Division Multiple Access (CDMA) system, a Wideband Code Division Multiple Access (WCDMA) system, a General Packet Radio Service (GPRS) system, a long term evolution/Long Term Evolution Advanced (LTE-A) system, and an NR system.

User equipment UE, also referred to as a terminal device, a mobile user device, or the like, may communicate with one or more core networks through a Radio Access Network (RAN). The user equipment may be a terminal device, such as a mobile phone (also referred to as a "cellular" phone) and a computer with a terminal device, for example, may be a portable, pocket-sized, handheld, computer built-in, or in-vehicle mobile apparatus, which exchanges voice and/or data with the radio access network.

A network device, also referred to as a base station, may be a Base Transceiver Station (BTS) in GSM or CDMA, a NodeB in WCDMA, an evolved NodeB (evolved Node B, eNB, or e-NodeB) in LTE, or a 5G NodeB (gNB).

The technical solutions provided in the embodiments of this application are described in detail below with reference to the accompanying drawings.

Figure 1:
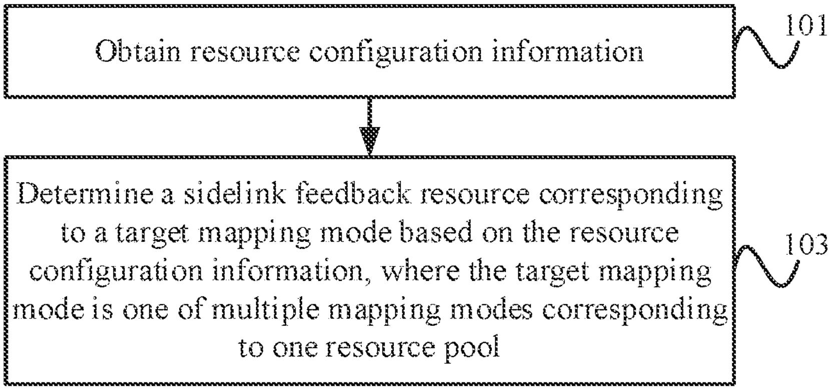
FIG. 1 is a schematic flowchart of a sidelink feedback resource configuration method according to an embodiment of this application.

Referring to FIG. 1, an embodiment of this application provides a sidelink feedback resource configuration method, which is executed by a terminal device. The terminal device may be UE of a different type, such as an R16 UE or an R17 UE. The method includes the following process steps.

Step 101. Obtain resource configuration information.

In some embodiments, in step 101, the obtaining resource configuration information may be implemented in at least one of the following manners: being specified by a protocol, being configured by a network, being preconfigured, or being indicated by another terminal device.

In some embodiments, the resource configuration information includes at least one of the following: feedback resource signaling, a frequency-domain offset, or a resource indication value.

Step 103. Determine a sidelink feedback resource corresponding to a target mapping mode based on the resource configuration information, where the target mapping mode is one of multiple mapping modes corresponding to one resource pool.

In some embodiments, the mapping modes may refer to a correspondence between data received by the terminal device and feedback resources.

In some embodiments, the sidelink feedback resource may include a PSFCH resource and/or other types of feedback resources. Further, PSFCH feedback resources corresponding to different mapping modes in the multiple mapping modes may satisfy one of the following:

(1) The feedback resources corresponding to different mapping modes are all sidelink feedback channel PSFCH resources, and formats, sequence types, or base sequences (for example, Pseudo-random sequence and Low-PAPR sequence) corresponding to the sidelink feedback channel PSFCH resources are the same. However, the PSFCH feedback resources corresponding to different mapping modes are multiplexed, which, for example, may be Code Division Multiplexing (CDM), Frequency Division Multiplexing (FDM) or Time Division Multiplexing (TDM).

(2) The feedback resources corresponding to different mapping modes are all sidelink feedback channel PSFCH feedback resources, and formats, sequence types, or base sequences (for example, Pseudo-random sequence and Low-PAPR sequence) corresponding to different sidelink feedback channel PSFCH resources are different.

(3) The feedback resources corresponding to different mapping modes are different, including sidelink feedback channel PSFCH feedback resources and feedback resources of other channel types (for example, PSXCH feedback resources).

In this embodiment of this application, the terminal device using sidelink may determine, based on the obtained resource configuration information, a sidelink feedback resource corresponding to a target mapping mode required for sidelink feedback, where the target mapping mode is one of multiple mapping modes corresponding to one resource pool. In this way, according to this embodiment of this application, terminal devices can have consistent understanding on sidelink feedback resource configuration, so as to implement coexistence of mapping modes with different feedback periods, thereby avoiding conflicts of sidelink feedback resources. Further, the terminal devices can support configuration of multiple mapping modes for one resource pool, and the terminal devices configured with different mapping modes can communicate with each other. In addition, the terminal devices can be also supported to perform sidelink feedback by using a most appropriate feedback period under different communication requirements, so as to achieve the purposes of adjusting communication reliability and feedback delay and implementing power saving. In this way, the terminal device can flexibly adapt to a variety of communication needs.

In some embodiments, a difference between any two of the multiple mapping modes may be that: at least one of a resource period N, a feedback delay k, an occupied resource, a format, or a feedback channel corresponding to the two mapping modes is different. Different mapping modes in the multiple mapping modes may correspond to different types of UEs, for example, different mapping modes are applicable to R16 UEs and R17 UEs.

In an example, a resource period (or feedback period) of one mapping (which can be understood as an original mapping or a base mapping used by the terminal device) in the multiple mapping modes is N1, and a resource period (or feedback period) of another mapping (which can be understood as a target mapping) is N2. In the solution of this embodiment of this application, a new mapping that coexists with the original mapping may be generated on a basis of the original mapping; where (1) when $N1<N2$, that is, when the feedback period is increased, a feedback power can be reduced to implement power saving;

(2) when $N1>N2$, that is, when the feedback period is decreased, a feedback delay can be reduced and communication reliability can be improved; and (3) when N1=N2, a larger value of k indicates a larger feedback delay and a lower feedback power level, where a larger delay indicates lower implementation costs and processing power consumption for the UE, that is, the UE may use lower-end and more power-efficient chips.

In the sidelink feedback resource configuration method in this embodiment of this application, sidelink feedback resources corresponding to different mapping modes in the multiple mapping modes partially overlap or do not overlap at all in frequency domain.

In the sidelink feedback resource configuration method in this embodiment of this application, the resource configuration information includes at least one of the following: feedback resource signaling, a frequency-domain offset, or a resource indication value. That is, one or more of the feedback resource signaling, the frequency-domain offset, and the resource indication value may be used to accurately determine the sidelink feedback resource corresponding to the target mapping mode required by the terminal device. Based on the resource configuration information, a manner of determining the sidelink feedback resource corresponding to the target mapping mode may include but is not limited to the following specific embodiments.

Embodiment 1

In embodiment 1, the sidelink feedback resource corresponding to the target mapping mode may be determined based on the feedback resource signaling. The feedback resource signaling may be one in quantity.

In some embodiments, the feedback resource signaling includes first feedback resource signaling, where the first feedback resource signaling is used for determining a sidelink feedback resource corresponding to at least one of the multiple mapping modes, and the at least one mapping mode includes the target mapping mode.

It can be understood that the terminal device can identify only the first feedback resource signaling, and can determine, based on the first feedback resource signaling, the sidelink feedback resource corresponding to the target mapping mode. In some embodiments, a type of the terminal device in this case may be R16 UE.

In an example, using a PSFCH resource and a terminal device being R16 UE or R17 UE as examples, the first feedback resource signaling is a bitmap, a value 1 in the bitmap indicates that a corresponding position is a PSFCH resource, and a value 0 indicates that a corresponding position is not a PSFCH resource. Then, the UE may obtain a PSFCH resource configuration of a first mapping (that is, a base mapping) based on values in the bitmap, and map a PSFCH resource of a target mapping to a frequency domain position that are not indicated as PSFCH resource in the bitmap. In this case, the PSFCH resource of the first mapping and the PSFCH resource of the target mapping do not overlap in frequency domain.

Embodiment 2

In embodiment 2, the sidelink feedback resource corresponding to the target mapping mode may be determined based on the feedback resource signaling. The feedback resource signaling may be multiple in quantity.

In some embodiments, the feedback resource signaling includes second feedback resource signaling and third feedback resource signaling. The second feedback resource signaling is used for determining a sidelink feedback resource corresponding to at least one of the multiple mapping modes, and the at least one mapping mode does not include the target mapping mode. The third feedback resource signaling is used for determining the sidelink feedback resource corresponding to the target mapping mode.

It can be understood that the terminal device can identify not only the second feedback resource signaling but also the third feedback resource signaling, and uses only the third feedback resource signaling to determine the sidelink feedback resource corresponding to the target mapping mode. In some embodiments, a type of the terminal device in this case may be R17 UE.

In an example, using a PSFCH resource and a terminal device being R17 UE as examples, the first feedback resource signaling and the second feedback resource signaling are both bitmaps, a value 1 in the bitmaps indicates that a corresponding position is a PSFCH resource, and a value 0 indicates that a corresponding position is not a PSFCH resource. Then, the UE may obtain a PSFCH resource configuration of a first mapping (that is, a base mapping) based on values in the bitmap of the first second feedback resource signaling, and obtains a PSFCH resource configuration of a target mapping based on the second feedback resource signaling. In this case, the PSFCH resource of the first mapping and the PSFCH resource of the target mapping do not overlap or partially overlap in frequency domain.

Embodiment 3

In embodiment 3, the sidelink feedback resource corresponding to the target mapping mode may be determined based on the frequency-domain offset. In some embodiments, the foregoing step 103 may be performed as follows:

performing frequency-domain shifting on a first sidelink feedback resource based on the frequency-domain offset and a frequency shift reference point, so as to obtain the sidelink feedback resource corresponding to the target mapping mode.

In some embodiments, the terminal device may obtain a starting point or an ending point (a minimum RB index or a maximum RB index) of the first sidelink feedback resource through unicast transmission, and may further calculate the frequency-domain offset f_offset according to a formula specified by a protocol.

The f_offset calculation formula is as follows:

(a) A PSFCH of a first mapping (that is, a base mapping) not overlapping a PSFCH of a second mapping (that is, a target mapping):

f_offset=PSFCH_RB_end2-PSFCH_RB_start1+1;

f_offset=PSFCH_RB_end1-PSFCH_RB_start2+1;

f_offset=PSFCH_bitmap_end2-PSFCH_bitmap_start1+1; and f_offset=PSFCH_bitmap_end1-PSFCH_bitmap_start2+1; where PSFCH_RB_start1 indicates a minimum index of RBs spanned by the PSFCH resource of the first mapping; PSFCH_RB_start2 indicates a minimum index of RBs spanned by the PSFCH resource of the second mapping; PSFCH_RB_end1 indicates a maximum index of RBs spanned by the PSFCH resource of the first mapping; PSFCH_RB_end2 indicates a maximum index of RBs spanned by the PSFCH resource of the second mapping; PSFCH_bitmap_start1 indicates a minimum bit index indicating the PSFCH resource in the bitmap of the first mapping; PSFCH_bitmap_start2 indicates a minimum bit index indicating the PSFCH resource in the bitmap of the second mapping; PSFCH_bitmap_end1 indicates a maximum bit index indicating the PSFCH resource in the bitmap of the first mapping; and PSFCH_bitmap_end2 indicates a maximum bit index indicating the PSFCH resource in the bitmap of the second mapping.

(b) The PSFCH of the first mapping partially overlapping the PSFCH of the second mapping:

f_offset=½*(PSFCH_RB_end2-PSFCH_RB_start1+1);

f_offset=½*(PSFCH_RB_end1-PSFCH_RB_start2+1);

f_offset=¼*(PSFCH_RB_end2-PSFCH_RB_start1+1);

f_offset=¼*(PSFCH_RB_end1-PSFCH_RB_start2+1);

f_offset=½*(PSFCH_bitmap_end2-PSFCH_bitmap_start1+1);

f_offset=½*(PSFCH_bitmap_end1-PSFCH_bitmap_start2+1);

f_offset=¼*(PSFCH_bitmap_end2-PSFCH_bitmap_start1+1); and f_offset=¼*(PSFCH_bitmap_end1-PSFCH_bitmap_start2+1); where PSFCH_RB_start1 indicates a minimum index of RBs spanned by the PSFCH resource of the first mapping; PSFCH_RB_start2 indicates a minimum index of RBs spanned by the PSFCH resource of the second mapping; PSFCH_RB_end1 indicates a maximum index of RBs spanned by the PSFCH resource of the first mapping; PSFCH_RB_end2 indicates a maximum index of RBs spanned by the PSFCH resource of the second mapping; PSFCH_bitmap_start1 indicates a minimum bit index indicating the PSFCH resource in the bitmap of the first mapping; PSFCH_bitmap_start2 indicates a minimum bit index indicating the PSFCH resource in the bitmap of the second mapping; PSFCH_bitmap_end1 indicates a maximum bit index indicating the PSFCH resource in the bitmap of the first mapping; and PSFCH_bitmap_end2 indicates a maximum bit index indicating the PSFCH resource in the bitmap of the second mapping.

In some embodiments, the frequency shift reference point includes one of the following:

(1) a starting point of Resource Block (RB) spanned by the sidelink feedback resource;
(2) an ending point of the RBs spanned by the sidelink feedback resource;
(3) a starting point of a Bandwidth Part (BWP);
(4) an ending point of the BWP;
(5) a starting point of a resource pool;
(6) an ending point of the resource pool;
(7) a starting point corresponding to bits being set to a first value in the bitmap; where, in some embodiments, the first value may include 1 or 0; or
(8) an ending point corresponding to the bits being set to the first value in the bitmap.

Figure 2:
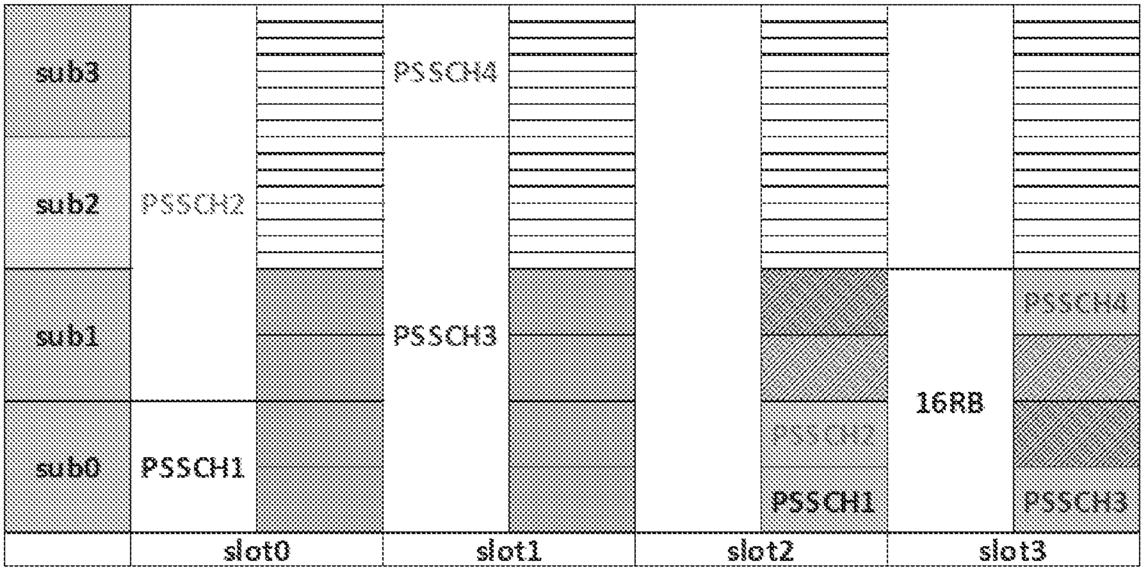
FIG. 2 is a schematic diagram of a mapping mode according to an embodiment of this application.
Figure 3:
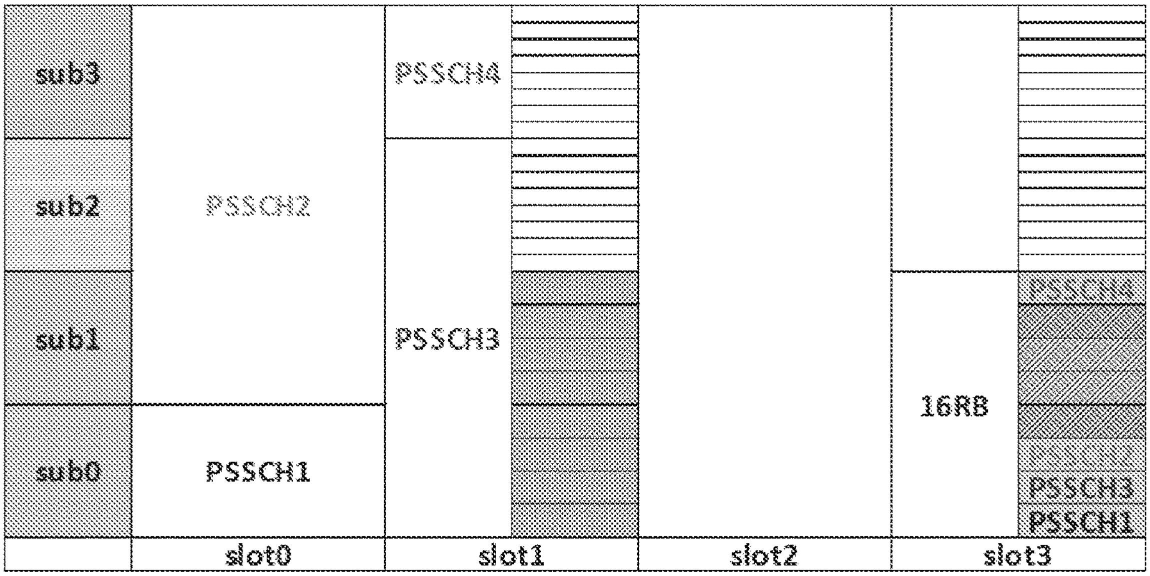
FIG. 3 is a schematic diagram of another mapping mode according to an embodiment of this application.
Figure 4:
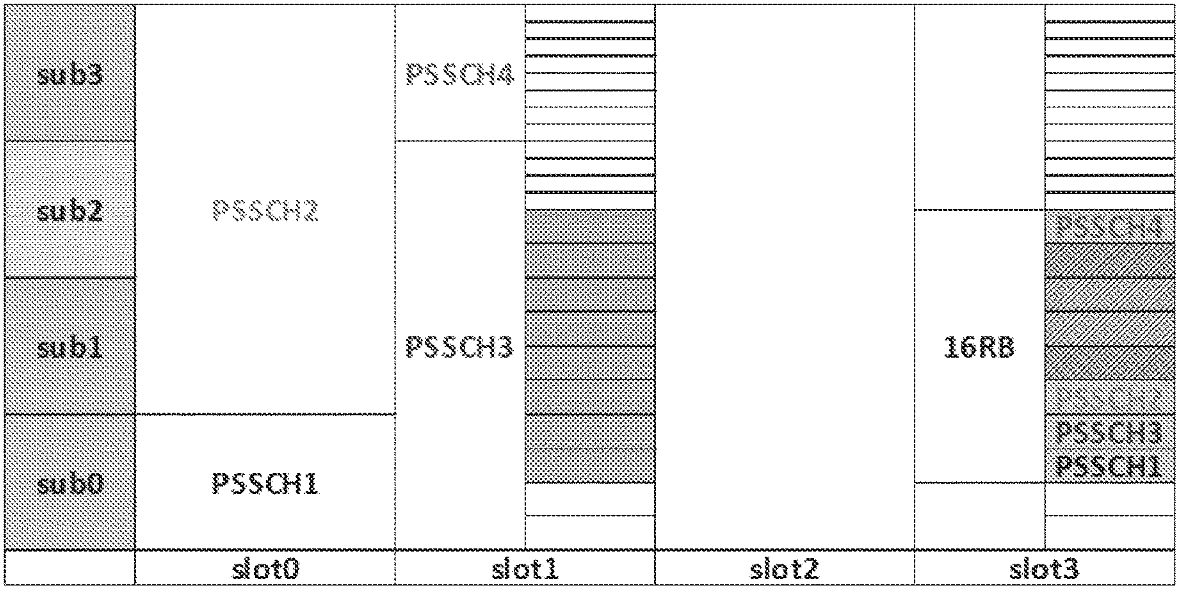
FIG. 4 is a schematic diagram of still another mapping mode according to an embodiment of this application.

In an example, the first mapping and the second mapping are shown in FIG. 2 and FIG. 3, respectively. In this case, the PSFCH resources of the two mappings have frequency domain conflicts, and UE corresponding to the second mapping performs frequency-domain shifting on the PSFCH resource of the original mapping by using f_offset. In some embodiments, a base station transmits PSFCH_RB_end1 to the UE corresponding to the second mapping through unicast transmission. The formula f_offset=¼*(PSFCH_RB_end1-PSFCH_RB_start2+1) is used as an example:

f_offset=¼*(PSFCH_RB_end1-PSFCH_RB_start2+1)=¼*(15-0+1)=4 RB;

and the UE corresponding to the second mapping uses a starting point of RB resources spanned by the PSFCH in the first mapping as a frequency shift reference point, and moves the PSFCH resource of the second mapping up by 4 RBs, as shown in FIG. 4.

Embodiment 4

In embodiment 4, the sidelink feedback resource corresponding to the target mapping mode may be determined based on the resource indication value. In some embodiments, the resource indication value is one or more in quantity.

Further, in a case that the resource indication value includes a first resource indication value and a second resource indication value, the foregoing step 103 may be performed as follows:

determining, based on the first resource indication value and the second resource indication value, the sidelink feedback resource corresponding to the target mapping mode.

Further, the step of determining, based on the first resource indication value and the second resource indication value, the sidelink feedback resource corresponding to the target mapping mode may be performed as follows:

based on the first resource indication value, determining a first resource parameter of a sidelink feedback resource corresponding to a first mapping mode in the multiple mapping modes; and based on the first resource parameter and a second resource parameter that is of a sidelink feedback resource and indicated by the second resource indication value, determining the sidelink feedback resource corresponding to the target mapping mode.

In some embodiments, the first resource parameter may include reference points such as a starting point or an ending point (a minimum RB index or a maximum RB index) of the resource; and the second resource parameter may include the number of consecutive RBs of the resource.

In an example, using the PSFCH resource as an example, a maximum RB index m of the PSFCH resource of the first mapping is obtained based on the resource indication value, and the number of RBs configured for the PSFCH resource of the second mapping (that is, the target mapping) is n. Then, the UE corresponding to the second mapping maps the PSFCH resource to n RBs with indexes m+1 to m+n.

Figure 5:
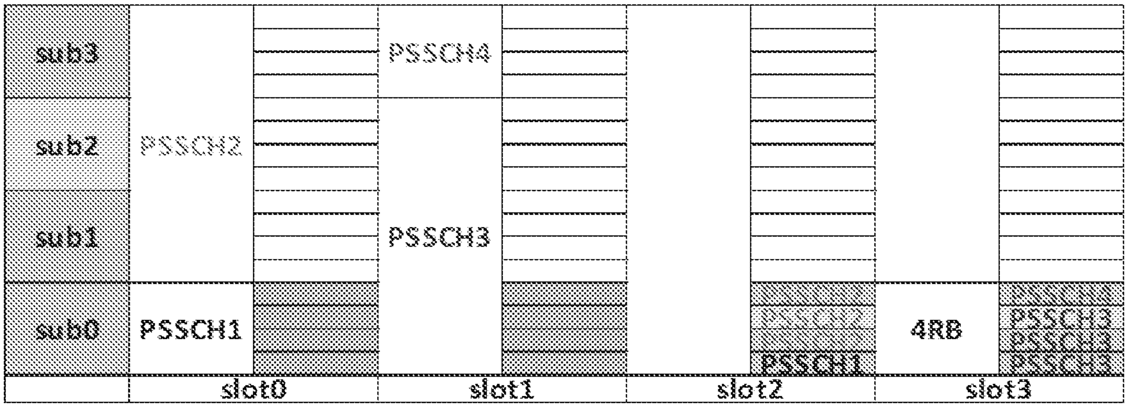
FIG. 5 is a schematic diagram of yet another mapping mode according to an embodiment of this application.
Figure 6:
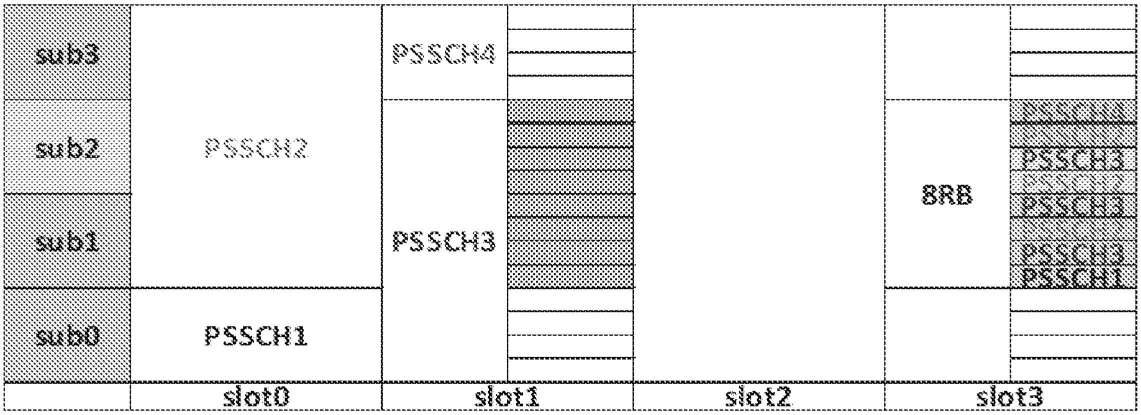
FIG. 6 is a schematic diagram of yet another mapping mode according to an embodiment of this application.

In another example, the first mapping (that is, the base mapping) is shown in FIG. 5, a maximum RB index of the PSFCH resource of the first mapping is 3, and a PSFCH resource configured by the network for the second mapping (the target mapping) is 8 consecutive RBs. The base station transmits, through unicast transmission, a first resource indication value and a second resource indication value to the UE corresponding to the second mapping. The first resource indication value is a maximum RB index of the PSFCH resource of the first mapping, and the second resource indication value is the number of consecutive RBs allocated to the PSFCH resource of the second mapping. Then, the PSFCH resource of the second mapping is mapped as shown in FIG. 6.

It should be noted that, in the sidelink feedback resource configuration method in this embodiment of this application, in addition to the manners of determining, based on the resource configuration information, the sidelink feedback resource corresponding to the target mapping mode in the specific embodiments 1 to 4, the following manners may be further included:

based on at least two of the feedback resource signaling, the frequency-domain offset, and the resource indication value, determining the sidelink feedback resource corresponding to the target mapping mode. That is, the sidelink feedback resource corresponding to the target mapping mode is determined in a manner of combining at least two of the feedback resource signaling, the frequency-domain offset, and the resource indication value.

In some embodiments, in the sidelink feedback resource configuration method according to this embodiment of this application, in a case that the number of resources in a sidelink feedback resource corresponding to a second mapping mode in the multiple mapping modes is the same as the number of resources in a sidelink feedback resource corresponding to a third mapping mode in the multiple mapping modes, the number of resources in a resource set corresponding to the second mapping mode and the number of resources in a resource set corresponding to the third mapping mode satisfy one of the following:

(1) If a first feedback period corresponding to the second mapping mode is smaller than a second feedback period corresponding to the third mapping mode, the number of resources in the resource set corresponding to the third mapping mode is less than the number of resources in the resource set corresponding to the second mapping mode.

(2) If the first feedback period is larger than the second feedback period, the number of resources in the resource set corresponding to the third mapping mode is greater than the number of resources in the resource set corresponding to the second mapping mode.

(3) If the first feedback period is equal to the second feedback period, the number of resources in the resource set corresponding to the third mapping mode is equal to the number of resources in the resource set corresponding to the second mapping mode.

The second mapping mode and the third mapping mode are any two different mapping modes of the multiple mapping modes, and the resource set is associated with time-frequency resources corresponding to a preset slot and a preset subchannel.

Figure 7:
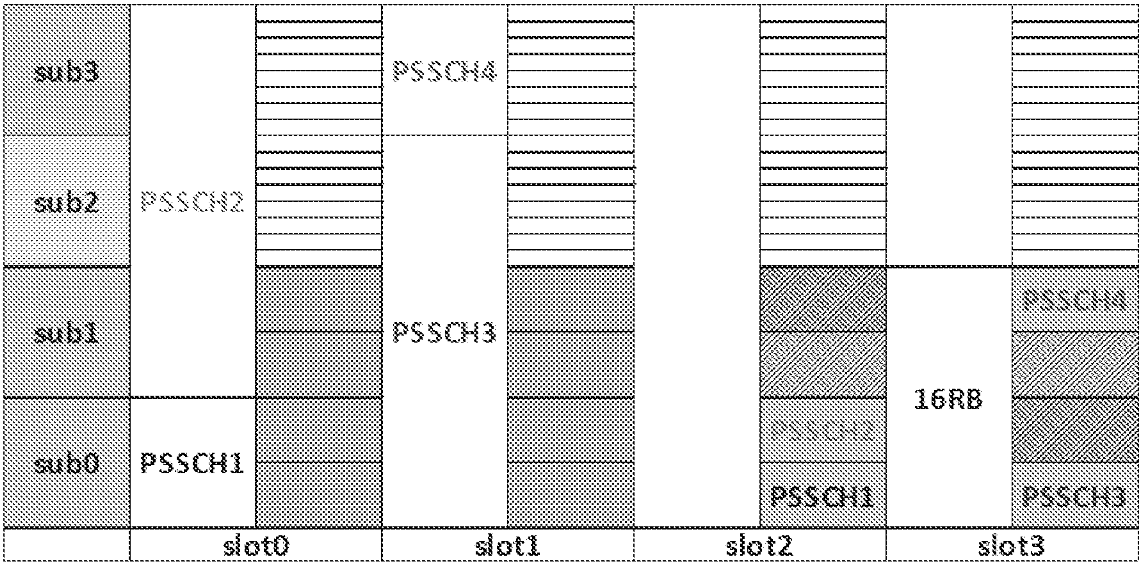
FIG. 7 is a schematic diagram of yet another mapping mode according to an embodiment of this application.
Figure 8:
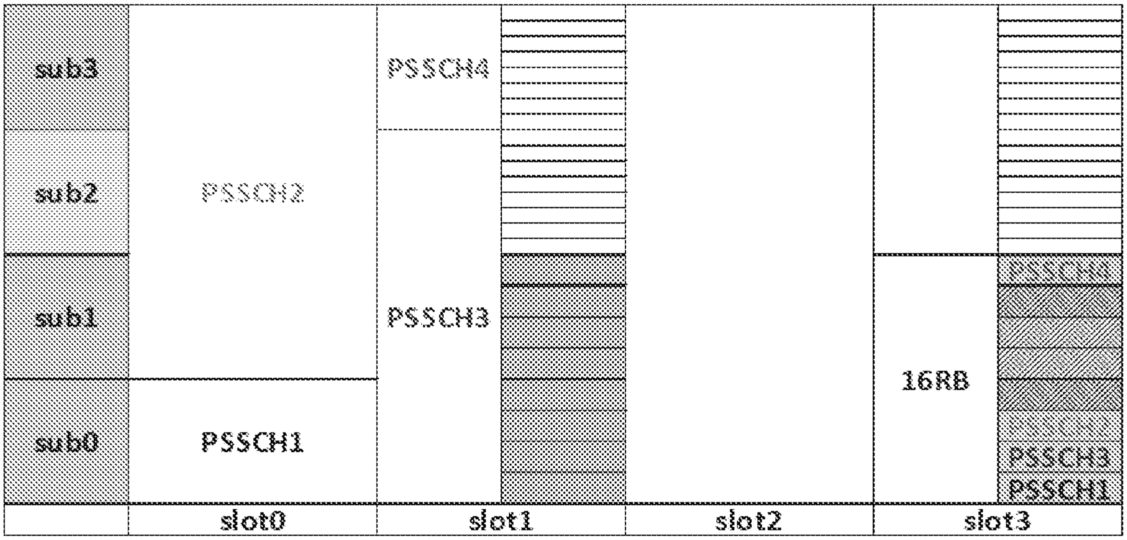
FIG. 8 is a schematic diagram of yet another mapping mode according to an embodiment of this application.

In an example, the number of RBs in the PSFCH resource is the same for both the second mapping and the third mapping, being 16 RBs. In this case, the number of RBs in a resource set in FIG. 7 is 16/4=4, and the number of RBs in a resource set in FIG. 8 is 16/8=2, that is, the number of RBs in the resource set of the third mapping is less than the number of RBs in the resource set of the second mapping.

In the sidelink feedback resource configuration method according to this embodiment of this application, in a case that the number of resources in a resource set corresponding to a fourth mapping mode in the multiple mapping modes is the same as the number of resources in a resource set corresponding to a fifth mapping mode in the multiple mapping modes, the number of resources in a sidelink feedback resource corresponding to the fourth mapping mode and the number of resources in a sidelink feedback resource corresponding to the fifth mapping mode satisfy one of the following:

(1) If a third feedback period corresponding to the fourth mapping mode is smaller than a fourth feedback period corresponding to the fifth mapping mode, the number of resources in the sidelink feedback resource corresponding to the fifth mapping mode is greater than the number of resources in the sidelink feedback resource corresponding to the fourth mapping mode.

(2) If the third feedback period is larger than the fourth feedback period, the number of resources in the sidelink feedback resource corresponding to the fifth mapping mode is less than the number of resources in the sidelink feedback resource corresponding to the fourth mapping mode.

(3) If the third feedback period is equal to the fourth feedback period, the number of resources in the sidelink feedback resource corresponding to the fifth mapping mode is equal to the number of resources in the sidelink feedback resource corresponding to the fourth mapping mode.

The fourth mapping mode and the fifth mapping mode are any two different mapping modes of the multiple mapping modes, and the sidelink feedback resource is associated with time-frequency resources corresponding to a preset slot and a preset subchannel.

Figure 9:
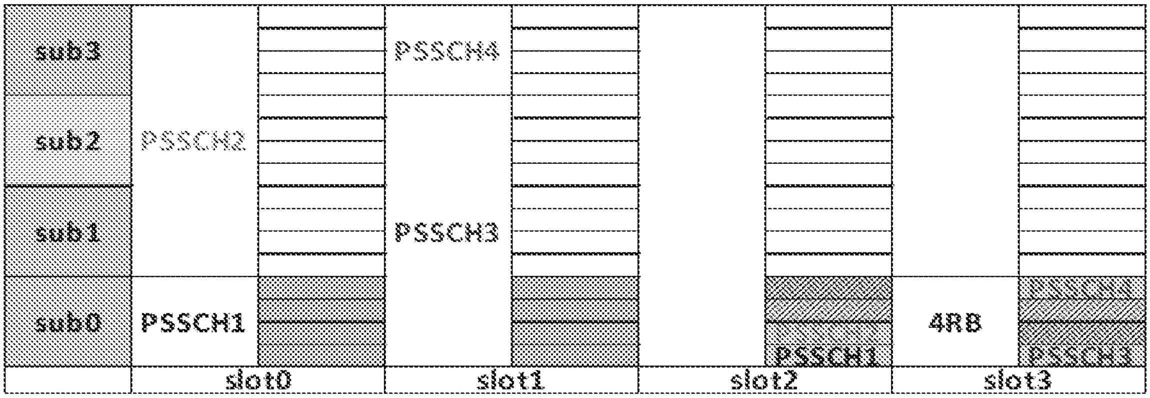
FIG. 9 is a schematic diagram of yet another mapping mode according to an embodiment of this application.
Figure 10:
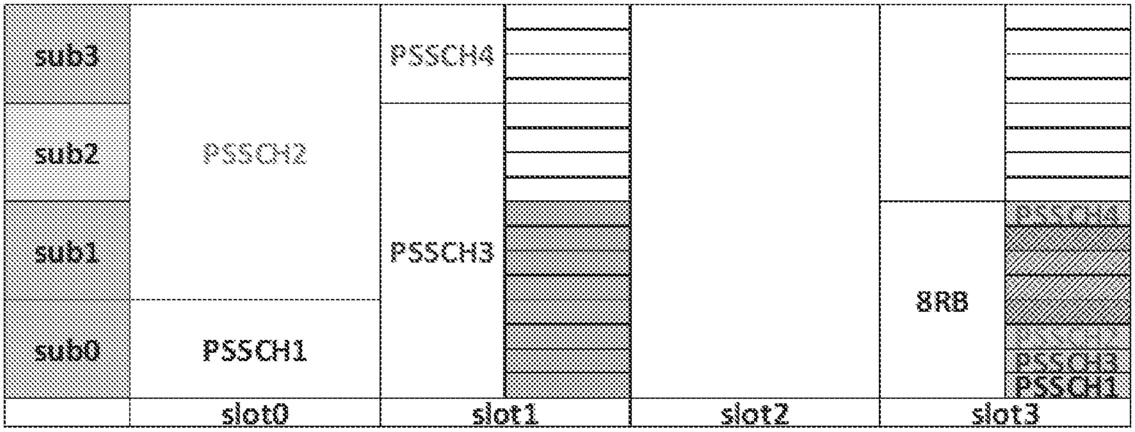
FIG. 10 is a schematic diagram of yet another mapping mode according to an embodiment of this application.

In an example, the number of RBs in the PSFCH resource is the same for both the fourth mapping and the fifth mapping, being 1 RB. In this case, the number of RBs in a PSFCH resource in FIG. 9 is 4*1=4, and the number of RBs in a PSFCH resource in FIG. 10 is 8*1=8, that is, the number of RBs in the PSFCH resource of the fifth mapping is greater than the number of RBs in the PSFCH resource of the fourth mapping.

The sidelink feedback resource configuration method in this embodiment of this application may further include the following content:

obtaining a time-domain offset; and performing time-domain shifting on a sixth mapping mode in the multiple mapping modes based on the time-domain offset; where a time domain resource corresponding to a seventh mapping mode in the multiple mapping modes and a time domain resource corresponding to a sixth mapping mode and obtained through time-domain shifting satisfy a target position relationship.

It can be understood that time-domain shifting may be performed on any one of the multiple mapping modes based on a received time-domain offset, and a time domain resource corresponding to another mapping mode in the multiple mapping modes than the mapping mode on which time-domain shifting is performed and a time domain resource corresponding to the mapping mode on which time-domain shifting is performed satisfy a specific time domain position relationship.

In some embodiments, the target position relationship includes one of the following:

(1) Even-numbered slots corresponding to the sixth mapping mode obtained through time-domain shifting are aligned with even-numbered slots corresponding to the seventh mapping mode.

(2) Even-numbered slots corresponding to the sixth mapping mode obtained through time-domain shifting are aligned with odd-numbered slots corresponding to the seventh mapping mode.

(3) A slot starting point (for example, slot 0) corresponding to the sixth mapping mode obtained through time-domain shifting is aligned with a slot starting point corresponding to the seventh mapping mode.

Figure 11:
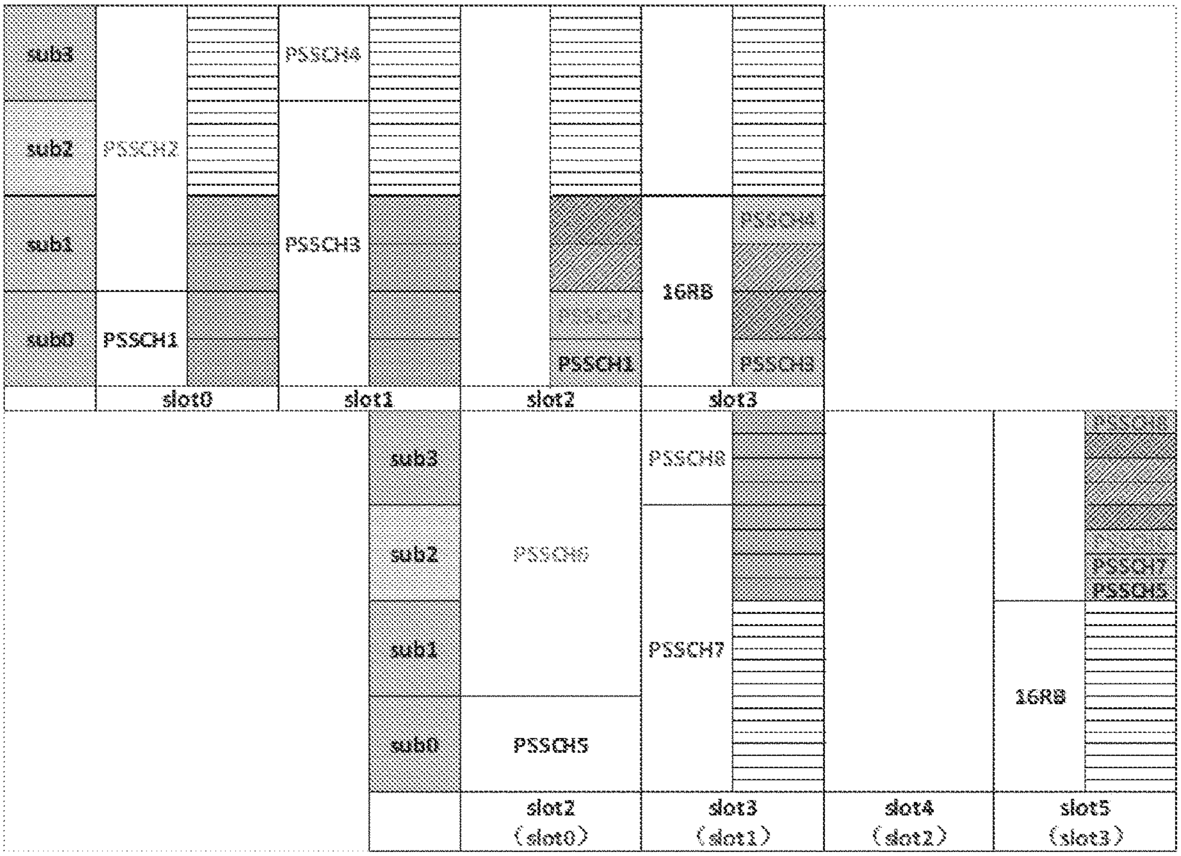
FIG. 11 is a schematic diagram of yet another mapping mode according to an embodiment of this application.
Figure 12:
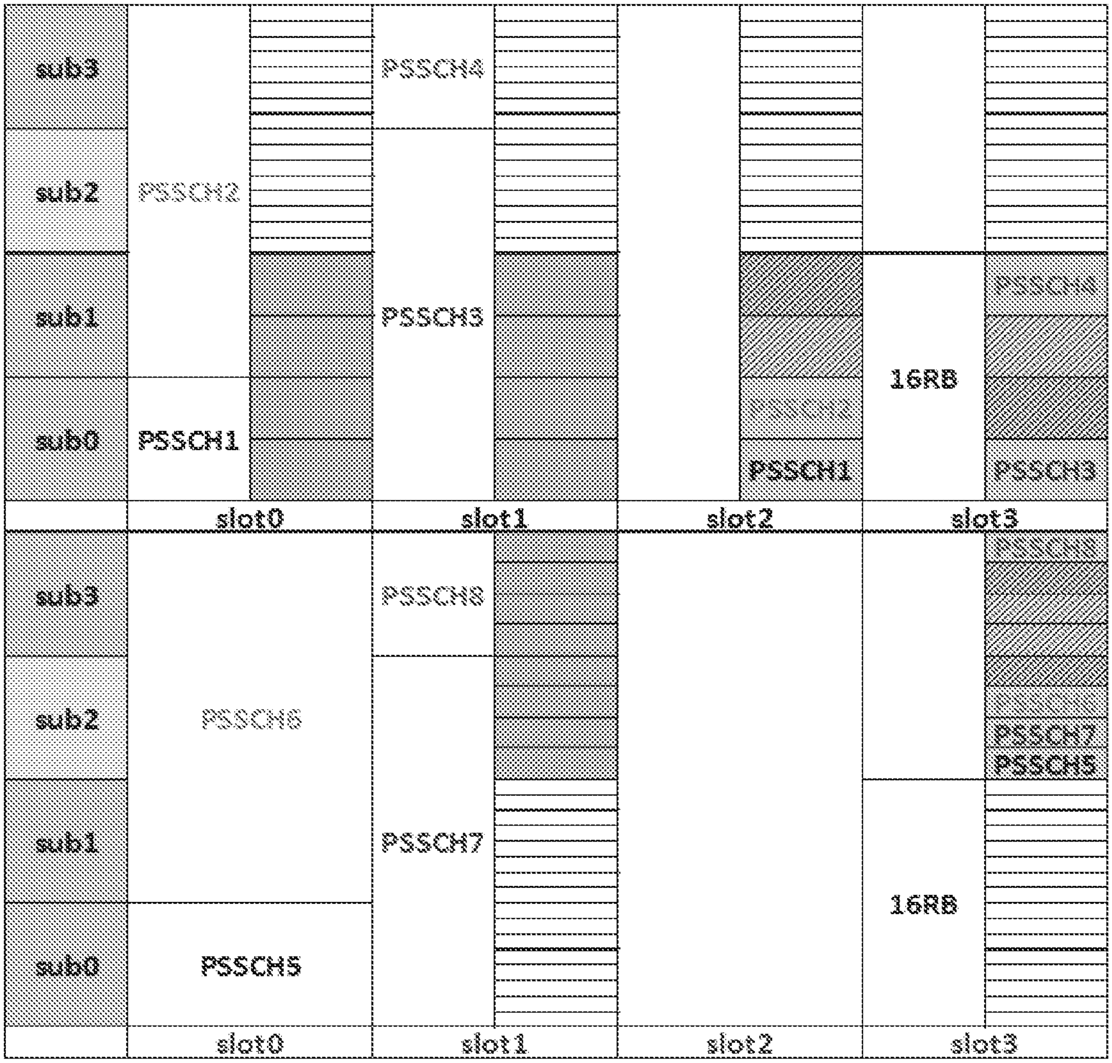
FIG. 12 is a schematic diagram of yet another mapping mode according to an embodiment of this application.

In an example, a time domain relationship between a sixth mapping and a seventh mapping is shown in FIG. 11. The upper half of the figure is the sixth mapping, and the lower half is the seventh mapping. UE corresponding to the sixth mapping obtains a time-domain offset t_offset=2 slots based on network configuration. If time-domain shifting is performed on the sixth mapping in a manner of slot index=slot index-t_offset, a time-domain relationship obtained through shifting is shown in FIG. 12. In this case, slot 0 of the sixth mapping is aligned with slot 0 of the seventh mapping.

The sidelink feedback resource configuration method in this embodiment of this application may further include the following content:

obtaining at least one of a resource period or a feedback delay of the sidelink feedback resource corresponding to the target mapping mode in one of the following manners: being specified by a protocol, being configured by a network, being preconfigured, or being indicated by another terminal device.

It can be understood that, when determining, based on the resource configuration information, the sidelink feedback resource corresponding to the target mapping mode, the terminal device may further combine at least one of the resource period and the feedback delay of the sidelink feedback resource corresponding to the target mapping mode.

It should be noted that, in the sidelink feedback resource configuration method according to this embodiment of this application, using the sidelink feedback resource being a PSFCH resource as an example, there are two mapping rules between PSSCH and corresponding PSFCH feedback resources:

Option 1: HARQ-ACK information is transmitted only on a PSFCH feedback resource corresponding to a starting subchannel in subchannels occupied by PSSCH data.

Option 2: HARQ-ACK information is transmitted on a PSFCH feedback resource corresponding to all subchannels occupied by PSSCH data.

Figure 13:
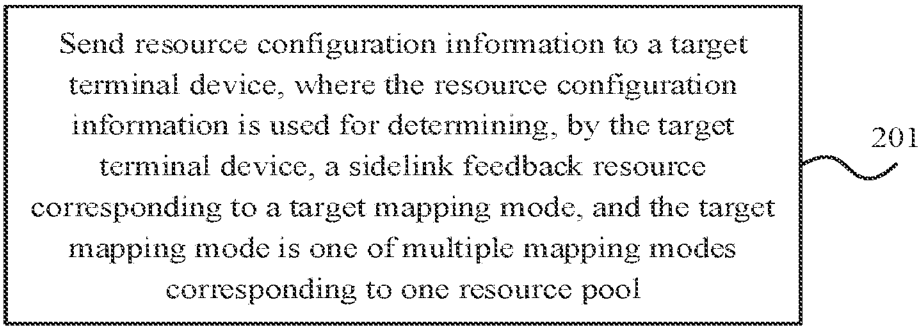
FIG. 13 is a schematic flowchart of another sidelink feedback resource configuration method according to an embodiment of this application.

Referring to FIG. 13, an embodiment of this application provides a sidelink feedback resource configuration method, which is executed by a communications device. The communications device may include a network device or one of two terminal devices that communicate through sidelink, and the method includes the following process steps.

Step 201. Send resource configuration information to a target terminal device, where the resource configuration information is used for determining, by the target terminal device, a sidelink feedback resource corresponding to a target mapping mode, and the target mapping mode is one of multiple mapping modes corresponding to one resource pool.

In some embodiments, the mapping modes may refer to a correspondence between data received by the terminal device and feedback resources.

In some embodiments, the sidelink feedback resource may include a PSFCH resource and/or other types of feedback resources. Further, PSFCH feedback resources corresponding to different mapping modes in the multiple mapping modes may satisfy one of the following:

(1) The feedback resources corresponding to different mapping modes are all sidelink feedback channel PSFCH resources, and formats, sequence types, or base sequences (for example, Pseudo-random sequence and Low-PAPR sequence) corresponding to the sidelink feedback channel PSFCH resources are the same. However, the PSFCH feedback resources corresponding to different mapping modes are multiplexed, which, for example, may be Code Division Multiplexing (CDM), Frequency Division Multiplexing (FDM), or Time Division Multiplexing (TDM).

(2) The feedback resources corresponding to different mapping modes are all sidelink feedback channel PSFCH feedback resources, and formats, sequence types, or base sequences (for example, Pseudo-random sequence and Low-PAPR sequence) corresponding to different sidelink feedback channel PSFCH resources are different.

(3) The feedback resources corresponding to different mapping modes are different, including sidelink feedback channel PSFCH feedback resources and feedback resources of other channel types (for example, PSXCH feedback resources).

In this embodiment of this application, the resource configuration information is provided for the target terminal device using sidelink, so that the target terminal device can determine, based on the resource configuration information, a sidelink feedback resource corresponding to a target mapping mode required for sidelink feedback, where the target mapping mode is one of multiple mapping modes corresponding to one resource pool. In this way, according to this embodiment of this application, terminal devices can have consistent understanding on sidelink feedback resource configuration, so as to implement coexistence of mapping modes with different feedback periods, thereby avoiding conflicts of sidelink feedback resources. Further, the terminal devices can support configuration of multiple mapping modes for one resource pool, and the terminal devices configured with different mapping modes can communicate with each other. In addition, the terminal devices can be also supported to perform sidelink feedback by using a most appropriate feedback period under different communication requirements, so as to achieve the purposes of adjusting communication reliability and feedback delay and implementing power saving. In this way, the terminal device can flexibly adapt to a variety of communication needs.

In some embodiments, a difference between any two of the multiple mapping modes may be that: at least one of a resource period N, a feedback delay k, an occupied resource, a format, or a feedback channel corresponding to the two mapping modes is different. Different mapping modes in the multiple mapping modes may correspond to different types of UEs, for example, different mapping modes are applicable to R16 UEs and R17 UEs.

In an example, a resource period (or feedback period) of one mapping (which can be understood as an original mapping or a base mapping used by the terminal device) in the multiple mapping modes is N1, and a resource period (or feedback period) of another mapping (which can be understood as a target mapping) is N2. In the solution of this embodiment of this application, a new mapping that coexists with the original mapping may be generated on a basis of the original mapping; where (1) when $N1<N2$, that is, when the feedback period is increased, a feedback power can be reduced to implement power saving;

(2) when $N1>N2$, that is, when the feedback period is decreased, a feedback delay can be reduced and communication reliability can be improved; and (3) when $N1=N2$, a larger value of k indicates a larger feedback delay and a lower feedback power level, where a larger delay indicates lower implementation costs and processing power consumption for the UE, that is, the UE may use lower-end and more power-efficient chips.

In the sidelink feedback resource configuration method in this embodiment of this application, sidelink feedback resources corresponding to different mapping modes in the multiple mapping modes partially overlap or do not overlap at all in frequency domain.

The sidelink feedback resource configuration method in this embodiment of this application, the resource configuration information includes at least one of the following:

(1) Feedback Resource Signaling

In some embodiments, the feedback resource signaling may be one in quantity. For example, the feedback resource signaling includes first feedback resource signaling, and the first feedback resource signaling is used for determining a sidelink feedback resource corresponding to at least one of the multiple mapping modes, where the at least one mapping mode includes the target mapping mode.

It can be understood that the target terminal device can identify only the first feedback resource signaling, and can determine, based on the first feedback resource signaling, the sidelink feedback resource corresponding to the target mapping mode. In some embodiments, a type of the target terminal device in this case may be R16 UE.

In some embodiments, the feedback resource signaling may be multiple in quantity. For example, the feedback resource signaling includes second feedback resource signaling and third feedback resource signaling. The second feedback resource signaling is used for determining a sidelink feedback resource corresponding to at least one of the multiple mapping modes, and the at least one mapping mode does not include the target mapping mode. The third feedback resource signaling is used for determining the sidelink feedback resource corresponding to the target mapping mode.

It can be understood that the target terminal device can identify not only the second feedback resource signaling but also the third feedback resource signaling, and uses only the third feedback resource signaling to determine the sidelink feedback resource corresponding to the target mapping mode. In some embodiments, a type of the target terminal device in this case may be R17 UE.

(2) Frequency-Domain Offset

In some embodiments, the frequency-domain offset may be used for performing frequency-domain shifting on a first sidelink feedback resource by the target terminal device based on a frequency shift reference point, to obtain the sidelink feedback resource corresponding to the target mapping mode.

In some embodiments, a starting point or an ending point (a minimum RB index or a maximum RB index) of the first sidelink feedback resource may be sent through unicast transmission, so that the target terminal device can further calculate the frequency-domain offset f_offset according to a formula specified by a protocol.

The f_offset calculation formula is as follows:

(a) A PSFCH of a first mapping (that is, a base mapping) not overlapping a PSFCH of a second mapping (that is, a target mapping):

f_offset=PSFCH_RB_end2-PSFCH_RB_start1+1;

f_offset=PSFCH_RB_end1-PSFCH_RB_start2+1;

f_offset=PSFCH_bitmap_end2-PSFCH_bitmap_start1+1; and f_offset=PSFCH_bitmap_end1-PSFCH_bitmap_start2+1; where PSFCH_RB_start1 indicates a minimum index of RBs spanned by the PSFCH resource of the first mapping; PSFCH_RB_start2 indicates a minimum index of RBs spanned by the PSFCH resource of the second mapping; PSFCH_RB_end1 indicates a maximum index of RBs spanned by the PSFCH resource of the first mapping; PSFCH_RB_end2 indicates a maximum index of RBs spanned by the PSFCH resource of the second mapping; PSFCH_bitmap_start1 indicates a minimum bit index indicating the PSFCH resource in the bitmap of the first mapping; PSFCH_bitmap_start2 indicates a minimum bit index indicating the PSFCH resource in the bitmap of the second mapping; PSFCH_bitmap_end1 indicates a maximum bit index indicating the PSFCH resource in the bitmap of the first mapping; and PSFCH_bitmap_end2 indicates a maximum bit index indicating the PSFCH resource in the bitmap of the second mapping.

(b) The PSFCH of the first mapping partially overlapping the PSFCH of the second mapping:

f_offset=½*(PSFCH_RB_end2-PSFCH_RB_start1+1);

f_offset=½*(PSFCH_RB_end1-PSFCH_RB_start2+1);

f_offset=¼*(PSFCH_RB_end2-PSFCH_RB_start1+1);

f_offset=¼*(PSFCH_RB_end1-PSFCH_RB_start2+1);

f_offset=½*(PSFCH_bitmap_end2-PSFCH_bitmap_start1+1);

f_offset=½*(PSFCH_bitmap_end1-PSFCH_bitmap_start2+1);

f_offset=¼*(PSFCH_bitmap_end2-PSFCH_bitmap_start1+1); and f_offset=¼*(PSFCH_bitmap_end1-PSFCH_bitmap_start2+1); where PSFCH_RB_start1 indicates a minimum index of RBs spanned by the PSFCH resource of the first mapping; PSFCH_RB_start2 indicates a minimum index of RBs spanned by the PSFCH resource of the second mapping; PSFCH_RB_end1 indicates a maximum index of RBs spanned by the PSFCH resource of the first mapping; PSFCH_RB_end2 indicates a maximum index of RBs spanned by the PSFCH resource of the second mapping; PSFCH_bitmap_start1 indicates a minimum bit index indicating the PSFCH resource in the bitmap of the first mapping; PSFCH_bitmap_start2 indicates a minimum bit index indicating the PSFCH resource in the bitmap of the second mapping; PSFCH_bitmap_endl indicates a maximum bit index indicating the PSFCH resource in the bitmap of the first mapping; and PSFCH_bitmap_end2 indicates a maximum bit index indicating the PSFCH resource in the bitmap of the second mapping.

The frequency shift reference point includes one of the following:

(a) a starting point of resource blocks (RBs) spanned by a sidelink feedback resource;

(b) an ending point of the RBs spanned by the sidelink feedback resource;

(c) a starting point of a bandwidth part (BWP);

(d) an ending point of the BWP;

(e) a starting point of a resource pool;
(f) an ending point of the resource pool;
(g) a starting point corresponding to bits being set to a first value in a bitmap; where the first value may include 1 or 0; or
(h) an ending point corresponding to the bits being set to the first value in the bitmap.

(3) Resource Indication Value

In some embodiments, the resource indication value is one or more in quantity.

Further in some embodiments, the resource indication value may include a first resource indication value and a second resource indication value. The first resource indication value and the second resource indication value are used for determining, by the target terminal device, the sidelink feedback resource corresponding to the target mapping mode.

Further in some embodiments, the first resource indication value is used for determining, by the target terminal device, a first resource parameter of a sidelink feedback resource corresponding to a first mapping mode in the multiple mapping modes. The first resource parameter may include a reference point such as a starting point or an ending point (a minimum RB index or a maximum RB index) of the resource.

Further in some embodiments, the second resource indication value is used to indicate a second resource parameter of the sidelink feedback resource. The first resource parameter and the second resource parameter are used for determining, by the target terminal device, the sidelink feedback resource corresponding to the target mapping mode. The second resource parameter may include the number of consecutive RBs of the resource.

In some embodiments, in the sidelink feedback resource configuration method according to this embodiment of this application, in a case that the number of resources in a sidelink feedback resource corresponding to a second mapping mode in the multiple mapping modes is the same as the number of resources in a sidelink feedback resource corresponding to a third mapping mode in the multiple mapping modes, the number of resources in a resource set corresponding to the second mapping mode and the number of resources in a resource set corresponding to the third mapping mode satisfy one of the following:

(1) If a first feedback period corresponding to the second mapping mode is smaller than a second feedback period corresponding to the third mapping mode, the number of resources in the resource set corresponding to the third mapping mode is less than the number of resources in the resource set corresponding to the second mapping mode.

(2) If the first feedback period is larger than the second feedback period, the number of resources in the resource set corresponding to the third mapping mode is greater than the number of resources in the resource set corresponding to the second mapping mode.

(3) If the first feedback period is equal to the second feedback period, the number of resources in the resource set corresponding to the third mapping mode is equal to the number of resources in the resource set corresponding to the second mapping mode.

The second mapping mode and the third mapping mode are any two different mapping modes of the multiple mapping modes, and the resource set is associated with time-frequency resources corresponding to a preset slot and a preset subchannel.

In the sidelink feedback resource configuration method according to this embodiment of this application, in a case that the number of resources in a resource set corresponding to a fourth mapping mode in the multiple mapping modes is the same as the number of resources in a resource set corresponding to a fifth mapping mode in the multiple mapping modes, the number of resources in a sidelink feedback resource corresponding to the fourth mapping mode and the number of resources in a sidelink feedback resource corresponding to the fifth mapping mode satisfy one of the following:

(1) If a third feedback period corresponding to the fourth mapping mode is smaller than a fourth feedback period corresponding to the fifth mapping mode, the number of resources in the sidelink feedback resource corresponding to the fifth mapping mode is greater than the number of resources in the sidelink feedback resource corresponding to the fourth mapping mode.

(2) If the third feedback period is larger than the fourth feedback period, the number of resources in the sidelink feedback resource corresponding to the fifth mapping mode is less than the number of resources in the sidelink feedback resource corresponding to the fourth mapping mode.

(3) If the third feedback period is equal to the fourth feedback period, the number of resources in the sidelink feedback resource corresponding to the fifth mapping mode is equal to the number of resources in the sidelink feedback resource corresponding to the fourth mapping mode.

The fourth mapping mode and the fifth mapping mode are any two different mapping modes of the multiple mapping modes, and the sidelink feedback resource is associated with time-frequency resources corresponding to a preset slot and a preset subchannel.

The sidelink feedback resource configuration method in this embodiment of this application may further include the following content:

determining a time-domain offset; and sending the time-domain offset to the target terminal device, where the time-domain offset is used for performing time-domain shifting on a sixth mapping mode in the multiple mapping modes by the target terminal device. A time domain resource corresponding to a seventh mapping mode in the multiple mapping modes and a time domain resource corresponding to the sixth mapping mode obtained through time-domain shifting satisfy a target position relationship.

It can be understood that a time-domain offset may be provided to the target terminal device, so that the target terminal device performs time-domain shifting on any one of the multiple mapping modes. In this way, a time domain resource corresponding to another mapping mode in the multiple mapping modes than the mapping mode on which time-domain shifting is performed and a time domain resource corresponding to the mapping mode on which time-domain shifting is performed satisfy a specific time domain position relationship.

In some embodiments, the target position relationship includes one of the following:

(1) Even-numbered slots corresponding to the sixth mapping mode obtained through time-domain shifting are aligned with even-numbered slots corresponding to the seventh mapping mode.

(2) Even-numbered slots corresponding to the sixth mapping mode obtained through time-domain shifting are aligned with odd-numbered slots corresponding to the seventh mapping mode.

(3) A slot starting point (for example, slot 0) corresponding to the sixth mapping mode obtained through time-domain shifting is aligned with a slot starting point corresponding to the seventh mapping mode.

The sidelink feedback resource configuration method in this embodiment of this application may further include the following content:

determining at least one of a resource period or a feedback delay of the sidelink feedback resource corresponding to the target mapping mode; and sending, to the target terminal device, the at least one of the resource period or feedback delay of the sidelink feedback resource corresponding to the target mapping mode.

It can be understood that at least one of the resource period or feedback delay of the sidelink feedback resource corresponding to the target mapping mode can be provided to the target terminal device, so that the target terminal device can determine the sidelink feedback resource corresponding to the target mapping mode further in combination with the at least one of the resource period or feedback delay of the resource.

It should be noted that, in the sidelink feedback resource configuration method according to this embodiment of this application, using the sidelink feedback resource being a PSFCH resource as an example, there are two mapping rules between PSSCH and corresponding PSFCH feedback resources:

Option 1: HARQ-ACK information is transmitted only on a PSFCH feedback resource corresponding to a starting subchannel in subchannels occupied by PSSCH data.

Option 2: HARQ-ACK information is transmitted on a PSFCH feedback resource corresponding to all subchannels occupied by PSSCH data.

Figure 14:
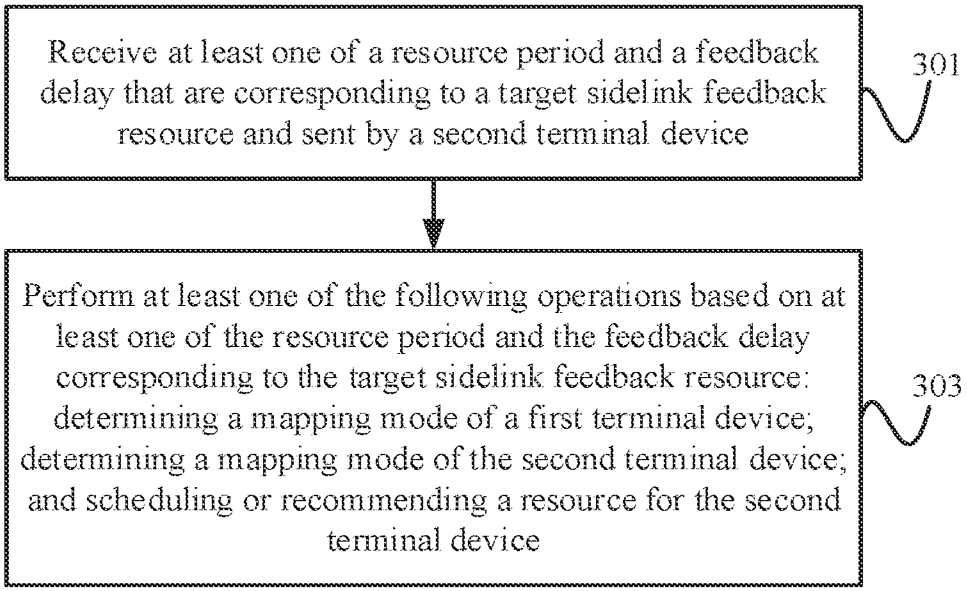
FIG. 14 is a schematic flowchart of an information processing method according to an embodiment of this application.

Referring to FIG. 14, an embodiment of this application provides an information processing method, which is executed by a first terminal device. The method includes the following process steps.

Step 301. Receive at least one of a resource period or a feedback delay that are corresponding to a target sidelink feedback resource and sent by a second terminal device.

In some embodiments, the second terminal device may be a terminal device that communicates with the first terminal device through sidelink or a terminal device that broadcasts; and the target sidelink feedback resource may include: a PSFCH resource and/or other types of sidelink feedback resources.

Step 303. Perform at least one of the following operations based on at least one of the resource period or the feedback delay corresponding to the target sidelink feedback resource: determining a mapping mode of the first terminal device; determining a mapping mode of the second terminal device; and scheduling or recommending a resource for the second terminal device.

In this embodiment of this application, the first terminal device may determine a mapping mode of at least one of the two terminal devices based on at least one of the resource period N or the feedback delay k that are corresponding to the target sidelink feedback resource and provided by the second terminal device, so that the at least one of the two terminal devices can smoothly implement feedback of HARQ information based on the determined mapping mode; and/or schedules or recommends a sidelink feedback resource for the second terminal device based on N and/or k, thereby improving efficiency of the second terminal device in determining an appropriate resource.

The HARQ information includes Acknowledgement (ACK) information or Negative Acknowledgement (NACK) information.

In some embodiments, in a case that N and/or k corresponding to the target sidelink feedback resource is used for scheduling or recommending a resource for the second terminal device, in an example, the first terminal device UE1 receives a value of N being 4 that is provided by the second terminal device UE2, and then the UE1 may determine, based on N, an association relationship between a data channel and a feedback channel that are of the UE2, and further recommends an appropriate resource for the UE2 in consideration of factors such as power consumption or delay requirements.

In the information processing method in this embodiment of this application, at least one of the resource period or the feedback delay corresponding to the target sidelink feedback resource is indicated by a target object. The target object includes at least one of the following:

(1) Sidelink control information SCI, where it can be understood that at least one of the resource period N or the feedback delay k corresponding to the target sidelink feedback resource may be carried in the SCI.

In an example, when the second terminal device indicates a value of N and a value of k corresponding to its own PSFCH mapping by using the SCI, a possible implementation is:

being indicated by using an SCI format 1-A, and adding a new PSFCHindication indication field, which occupies a total of 4 bits: a0, a1, a2, and a3 to indicate an index corresponding to a combination of the value of N and the value of k, as shown in the following table:

| Index | N | k |
|---|---|---|
| 0 | 1 | 2 |
| 1 | 1 | 2 |
| 2 | 2 | 2 |
| 3 | 2 | 2 |
| 4 | 4 | 2 |
| 5 | 4 | 3 |
| 6 | 8 | 3 |
| 7 | 8 | 3 |
| 8 | 16 | 3 |
| 9 | 16 | 3 |

For example, if the value of N corresponding to the PSFCH mapping of the second terminal device is 2, and the value of k is 2, an index indicated by PSFCH indication is 3, and values corresponding to a0, a1, a2, and a3 are set to 0, 0, 1, and 1, respectively.

In another example, when the second terminal device indicates a value of k corresponding to its own PSFCHmapping by using the SCI, a possible implementation is:

using a 2nd-stage SCI format indication field of SCI format 1-A to indicate an index corresponding to the value of k, occupying a total of 2 bits: a0 and a1, and a correspondence is shown in the following table:

| Value of the 2nd-stage SCI format indication field | 2nd-stage SCI format indication field |
|---|---|
| 00 | SCI format 2-A |
| 01 | SCI format 2-B |
| 10 | k = 2 |
| 11 | k = 3 |

For example, if the value of k corresponding to PSFCH-mapping of the second terminal device UE1 is 2, the value of the 2nd-stage SCI format indication field is "10", that is, an index indicated by the 2nd-stage SCI format indication field is 2, and a0 and al are set to 1 and 0, respectively.

(2) SCI format, where it can be understood that at least one of the resource period N or the feedback delay k corresponding to the target sidelink feedback resource is implicitly indicated to the first terminal device by the second terminal device by using the SCI format.

In an example, the value of N is implicitly indicated to be 2 by the second terminal device by using format 1-A, and the value of k is implicitly indicated to be 2 by the second terminal device by using format 1-A.

(3) Media access control MAC control element CE, where it can be understood that at least one of the resource period N or the feedback delay k corresponding to the target sidelink feedback resource may be carried in the MAC CE.

(4) MAC protocol data unit PDU, where it can be understood that at least one of the resource period N or the feedback delay k corresponding to the target sidelink feedback resource may be carried in the MAC PDU.

(5) PC5 radio resource control RRC request, where it can be understood that at least one of the resource period N or the feedback delay k corresponding to the target sidelink feedback resource may be carried in an RRC request sent through a PC5 interface.

(6) Connection establishment message, where it can be understood that at least one of the resource period N or the feedback delay k corresponding to the target sidelink feedback resource may be carried in a connection establishment message, where a first connection establishment message includes sl-ConfigDedicatedNR, SIB12, SidelinkPreconfigNR, or the like.

In the information processing method in this embodiment of this application, the target object is used to indicate at least one of the following:

a value of the resource period; an index corresponding to the resource period; a bitmap corresponding to the resource period; a value of the feedback delay; an index corresponding to the feedback delay; and a bitmap corresponding to the feedback delay.

It should be noted that, in a case that the target object indicates both the value of the resource period and the value of the feedback delay, the value of the resource period and the value of the feedback delay may be the same or different; in a case that the target object indicates both the index corresponding to the resource period and the index corresponding to the feedback delay, the index corresponding to the resource period and the index corresponding to the feedback delay may be the same or different; in a case that the target object also indicates the bitmap corresponding to the resource period and the bitmap corresponding to the feedback delay, the bitmap corresponding to the resource period and the bitmap corresponding to the feedback delay may be the same or different.

Further in some embodiments, in a case that the target object indicates both the value of the resource period and the value of the feedback delay, the value of the resource period and the value of the feedback delay are the same, that is, one value corresponds to both the resource period and the feedback delay.

Further in some embodiments, in a case that the target object indicates both the index corresponding to the resource period and the index corresponding to the feedback delay, the index corresponding to the resource period and the index corresponding to the feedback delay are the same, that is, one index corresponds to both the resource period and the feedback delay.

Further in some embodiments, in a case that the target object indicates both the bitmap corresponding to the resource period and the bitmap corresponding to the feedback delay, the bitmap corresponding to the resource period and the bitmap corresponding to the feedback delay are the same, that is, one bitmap corresponds to both the resource period and the feedback delay.

In the information processing method in this embodiment of this application, at least one of the resource period or the feedback delay corresponding to the target sidelink feedback resource can be not only indicated by another terminal device (such as the second terminal device), but also be determined in at least one of the following manners: being specified by a protocol, being configured by a network, or being preconfigured.

Figure 15:
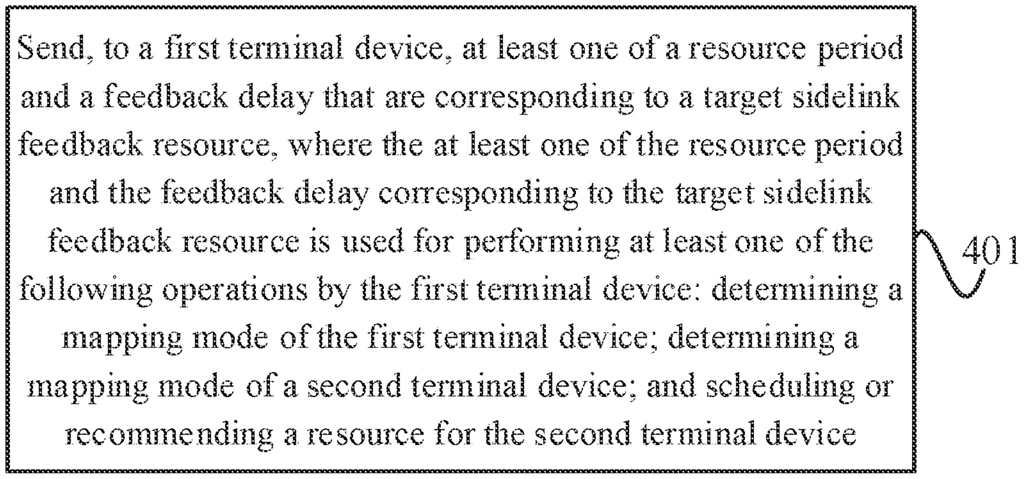
FIG. 15 is a schematic flowchart of another information processing method according to an embodiment of this application.

Referring to FIG. 15, an embodiment of this application provides an information processing method, which is executed by a second terminal device that communicates with a first terminal device through sidelink. The method includes the following process steps.

Step 401. Send, to a first terminal device, at least one of a resource period or a feedback delay that are corresponding to a target sidelink feedback resource, where the at least one of the resource period or the feedback delay corresponding to the target sidelink feedback resource is used for performing at least one of the following operations by the first terminal device: determining a mapping mode of the first terminal device; determining a mapping mode of the second terminal device; or scheduling or recommending a resource for the second terminal device.

In this embodiment of this application, the second terminal device may provide the first terminal device with at least one of the resource period N or the feedback delay k corresponding to the target sidelink feedback resource, so that the first terminal device can determine a mapping mode of at least one of the two terminal devices based on N and/or k and the at least one of the two terminal devices can smoothly implement feedback of HARQ information based on the determined mapping mode; and/or so that the first terminal device schedules or recommends a sidelink feedback resource for the second terminal device based on N and/or k, thereby improving efficiency of the second terminal device in determining an appropriate resource.

The HARQ information includes ACK information or NACK information.

In some embodiments, in a case that N and/or k corresponding to the target sidelink feedback resource is used for scheduling or recommending a resource for the second terminal device by the first terminal device, in an example, the second terminal device UE2 sends, to the first terminal device UE 1, a value of N being 4, and then the UE1 may determine, based on N, an association relationship between a data channel and a feedback channel that are of the UE2, and further recommends an appropriate resource for the UE2 in consideration of factors such as power consumption or delay requirements.

In some embodiments, the second terminal device may be a terminal device that communicates with the first terminal device through sidelink or a terminal device that broadcasts; and the target sidelink feedback resource may include: a PSFCH resource and/or other types of sidelink feedback resources.

In the information processing method in this embodiment of this application, at least one of the resource period or the feedback delay corresponding to the target sidelink feedback resource is indicated by a target object. The target object includes at least one of the following:

(1) Sidelink control information SCI, where it can be understood that at least one of the resource period N or the feedback delay k corresponding to the target sidelink feedback resource may be carried in the SCI for transmission.

In an example, when a value of N and a value of k corresponding to a PSFCH mapping are indicated by using SCI, a possible implementation is:

being indicated by using an SCI format 1-A, and adding a new PSFCHindication indication field, which occupies a total of 4 bits: a0, a1, a2, and a3 to indicate an index corresponding to a combination of the value of N and the value of k, as shown in the following table:

| Index | N | k |
|---|---|---|
| 0 | 1 | 2 |
| 1 | 1 | 2 |
| 2 | 2 | 2 |
| 3 | 2 | 2 |
| 4 | 4 | 2 |
| 5 | 4 | 3 |
| 6 | 8 | 3 |
| 7 | 8 | 3 |
| 8 | 16 | 3 |
| 9 | 16 | 3 |

For example, if the value of N corresponding to the PSFCH mapping of the second terminal device is 2, and the value of k is 2, an index indicated by PSFCH indication is 3, and values corresponding to a0, a1, a2, and a3 are set to 0, 0, 1, and 1, respectively.

In another example, when the second terminal device indicates a value of k corresponding to its own PSFCHmapping by using the SCI, a possible implementation is:

using a 2nd-stage SCI format indication field of SCI format 1-A to indicate an index corresponding to the value of k, occupying a total of 2 bits: a0 and a1, and a correspondence is shown in the following table:

| Value of the 2nd-stage SCI format indication field | 2nd-stage SCI format indication field |
|---|---|
| 00 | SCI format 2-A |
| 01 | SCI format 2-B |
| 10 | k = 2 |
| 11 | k = 3 |

For example, if the value of k corresponding to PSFCH-mapping of the second terminal device UE1 is 2, the value of the 2nd-stage SCI format indication field is "10", that is, an index indicated by the 2nd-stage SCI format indication field is 2, and a0 and a1 are set to 1 and 0, respectively.

(2) SCI format, where it can be understood that at least one of the resource period N or the feedback delay k corresponding to the target sidelink feedback resource is implicitly indicated by the SCI format.

In an example, format 1-A is used, a value of N and a value of k that are implicitly indicated are both 2.

(3) Media access control MAC control element CE, where it can be understood that at least one of the resource period N or the feedback delay k corresponding to the target sidelink feedback resource is carried in the MAC CE for transmission.

(4) MAC protocol data unit PDU, where it can be understood that at least one of the resource period N or the feedback delay k corresponding to the target sidelink feedback resource is carried in the MAC PDU for transmission.

(5) PC5 radio resource control RRC request, where it can be understood that at least one of the resource period N or the feedback delay k corresponding to the target sidelink feedback resource is carried in an RRC request sent through a PC5 interface.

(6) Connection establishment message, where it can be understood that at least one of the resource period N or the feedback delay k corresponding to the target sidelink feedback resource is carried in a connection establishment message, where a first connection establishment message includes sl-ConfigDedicatedNR, SIB12, SidelinkPreconfigNR, or the like.

In the information processing method in this embodiment of this application, the target object is used to indicate at least one of the following:

a value of the resource period; an index corresponding to the resource period; a bitmap corresponding to the resource period; a value of the feedback delay; an index corresponding to the feedback delay; and a bitmap corresponding to the feedback delay.

It should be noted that, in a case that the target object indicates both the value of the resource period and the value of the feedback delay, the value of the resource period and the value of the feedback delay may be the same or different; in a case that the target object indicates both the index corresponding to the resource period and the index corresponding to the feedback delay, the index corresponding to the resource period and the index corresponding to the feedback delay may be the same or different; in a case that the target object also indicates the bitmap corresponding to the resource period and the bitmap corresponding to the feedback delay, the bitmap corresponding to the resource period and the bitmap corresponding to the feedback delay may be the same or different.

Further in some embodiments, in a case that the target object indicates both the value of the resource period and the value of the feedback delay, the value of the resource period and the value of the feedback delay are the same, that is, one value corresponds to both the resource period and the feedback delay.

Further in some embodiments, in a case that the target object indicates both the index corresponding to the resource period and the index corresponding to the feedback delay, the index corresponding to the resource period and the index corresponding to the feedback delay are the same, that is, one index corresponds to both the resource period and the feedback delay.

Further in some embodiments, in a case that the target object indicates both the bitmap corresponding to the resource period and the bitmap corresponding to the feedback delay, the bitmap corresponding to the resource period and the bitmap corresponding to the feedback delay are the same, that is, one bitmap corresponds to both the resource period and the feedback delay.

Figure 16:
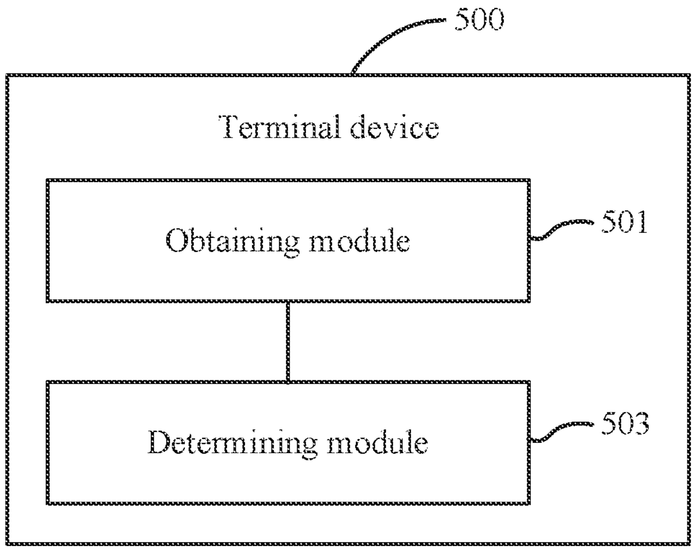
FIG. 16 is a schematic structural diagram of a terminal device according to an embodiment of this application.

Referring to FIG. 16, an embodiment of this application provides a terminal device 500. The terminal device 500 includes: an obtaining module 501 and a determining module 503.

The obtaining module 501 is configured to obtain resource configuration information; and the determining module 503 is configured to determine, based on the resource configuration information, a sidelink feedback resource corresponding to a target mapping mode, where the target mapping mode is one of multiple mapping modes corresponding to one resource pool.

In the terminal device 500 in this embodiment of this application, a manner of the obtaining resource configuration information includes at least one of the following: being specified by a protocol, being configured by a network, being preconfigured, or being indicated by another terminal device.

In the terminal device 500 in this embodiment of this application, the sidelink feedback resources corresponding to different mapping modes in the multiple mapping modes partially overlap or do not overlap at all in frequency domain.

In the terminal device 500 in this embodiment of this application, the resource configuration information includes at least one of the following: feedback resource signaling, a frequency domain offset, or a resource indication value.

In the terminal device 500 in this embodiment of this application, the feedback resource signaling includes first feedback resource signaling, where the first feedback resource signaling is used for determining a sidelink feedback resource corresponding to at least one of the multiple mapping modes, and the at least one mapping mode includes the target mapping mode.

In the terminal device 500 in this embodiment of this application, the feedback resource signaling includes second feedback resource signaling and third feedback resource signaling. The second feedback resource signaling is used for determining a sidelink feedback resource corresponding to at least one of the multiple mapping modes, and the at least one mapping mode does not include the target mapping mode. The third feedback resource signaling is used for determining a sidelink feedback resource corresponding to the target mapping mode.

In some embodiments, in the terminal device 500, the determining module 503 may be configured to perform frequency-domain shifting on a first sidelink feedback resource based on the frequency-domain offset and a frequency shift reference point, so as to obtain the sidelink feedback resource corresponding to the target mapping mode.

In the terminal device 500 in this embodiment of this application, the frequency shift reference point includes one of the following: a starting point of resource blocks RBs spanned by a sidelink feedback resource; an ending point of the RBs spanned by the sidelink feedback resource; a starting point of a bandwidth part BWP; an ending point of the BWP; a starting point of a resource pool; an ending point of the resource pool; a starting point corresponding to bits being set to a first value in a bitmap; or an ending point corresponding to the bits being set to the first value in the bitmap.

In the terminal device 500 in this embodiment of this application, the resource indication value may be one or more in quantity.

In the terminal device 500 in this embodiment of this application, in a case that the resource indication value includes a first resource indication value and a second resource indication value, the determining module 503 may be configured to:

determine, based on the first resource indication value and the second resource indication value, the sidelink feedback resource corresponding to the target mapping mode.

In the terminal device 500 in this embodiment of this application, the determining module 503 may be configured to:

based on the first resource indication value, determine a first resource parameter of a sidelink feedback resource corresponding to a first mapping mode in the multiple mapping modes; and based on the first resource parameter and a second resource parameter that is of a sidelink feedback resource and indicated by the second resource indication value, determine the sidelink feedback resource corresponding to the target mapping mode.

In the terminal device 500 in this embodiment of this application, in a case that the number of resources in a sidelink feedback resource corresponding to a second mapping mode in the multiple mapping modes is the same as the number of resources in a sidelink feedback resource corresponding to a third mapping mode in the multiple mapping modes, the number of resources in a resource set corresponding to the second mapping mode and the number of resources in a resource set corresponding to the third mapping mode satisfy one of the following:

if a first feedback period corresponding to the second mapping mode is smaller than a second feedback period corresponding to the third mapping mode, the number of resources in the resource set corresponding to the third mapping mode is less than the number of resources in the resource set corresponding to the second mapping mode; if the first feedback period is larger than the second feedback period, the number of resources in the resource set corresponding to the third mapping mode is greater than the number of resources in the resource set corresponding to the second mapping mode; and if the first feedback period is equal to the second feedback period, the number of resources in the resource set corresponding to the third mapping mode is equal to the number of resources in the resource set corresponding to the second mapping mode; where the second mapping mode and the third mapping mode are any two different mapping modes of the multiple mapping modes, and the resource set is associated with time-frequency resources corresponding to a preset slot and a preset subchannel.

In the terminal device 500 in this embodiment of this application, in a case that the number of resources in a resource set corresponding to a fourth mapping mode in the multiple mapping modes is the same as the number of resources in a resource set corresponding to a fifth mapping mode in the multiple mapping modes, the number of resources in a sidelink feedback resource corresponding to the fourth mapping mode and the number of resources in a sidelink feedback resource corresponding to the fifth mapping mode satisfy one of the following:

if a third feedback period corresponding to the fourth mapping mode is smaller than a fourth feedback period corresponding to the fifth mapping mode, the number of resources in the sidelink feedback resource corresponding to the fifth mapping mode is greater than the number of resources in the sidelink feedback resource corresponding to the fourth mapping mode; if the third feedback period is larger than the fourth feedback period, the number of resources in the sidelink feedback resource corresponding to the fifth mapping mode is less than the number of resources in the sidelink feedback resource corresponding to the fourth mapping mode; and if the third feedback period is equal to the fourth feedback period, the number of resources in the sidelink feedback resource corresponding to the fifth mapping mode is equal to the number of resources in the sidelink feedback resource corresponding to the fourth mapping mode; where the fourth mapping mode and the fifth mapping mode are any two different mapping modes of the multiple mapping modes, and the sidelink feedback resource is associated with time-frequency resources corresponding to a preset slot and a preset subchannel.

In the terminal device 500 in this embodiment of this application, the obtaining module 501 may be further configured to obtain a time-domain offset; and the determining module 503 may be further configured to perform time-domain shifting on a sixth mapping mode in the multiple mapping modes based on the time-domain offset; where a time domain resource corresponding to a seventh mapping mode in the multiple mapping modes and a time domain resource corresponding to a sixth mapping mode and obtained through time-domain shifting satisfy a target position relationship.

In the terminal device 500 in this embodiment of this application, the target position relationship includes one of the following: even-numbered slots corresponding to the sixth mapping mode obtained through time-domain shifting are aligned with even-numbered slots corresponding to the seventh mapping mode; even-numbered slots corresponding to the sixth mapping mode obtained through time-domain shifting are aligned with odd-numbered slots corresponding to the seventh mapping mode; or a slot starting point corresponding to the sixth mapping mode obtained through time-domain shifting is aligned with a slot starting point corresponding to the seventh mapping mode.

In the terminal device 500 in this embodiment of this application, the obtaining module 501 may be further configured to:

obtain at least one of a resource period or a feedback delay of the sidelink feedback resource corresponding to the target mapping mode in one of the following manners: being specified by a protocol, being configured by a network, being preconfigured, or being indicated by another terminal device.

It can be understood that the terminal device 500 provided in this embodiment of this application is capable of implementing the sidelink feedback resource configuration method performed by the terminal device 500. Related descriptions about configuration of sidelink feedback resources are all applicable to the terminal device 500, and details are not repeated herein.

In this embodiment of this application, the terminal device using sidelink may determine, based on the obtained resource configuration information, a sidelink feedback resource corresponding to a target mapping mode required for sidelink feedback, where the target mapping mode is one of multiple mapping modes corresponding to one resource pool. In this way, according to this embodiment of this application, terminal devices can have consistent understanding on sidelink feedback resource configuration, so as to implement coexistence of mapping modes with different feedback periods, thereby avoiding conflicts of sidelink feedback resources. Further, the terminal devices can support configuration of multiple mapping modes for one resource pool, and the terminal devices configured with different mapping modes can communicate with each other. In addition, the terminal devices can be also supported to perform sidelink feedback by using a most appropriate feedback period under different communication requirements, so as to achieve the purposes of adjusting communication reliability and feedback delay and implementing power saving. In this way, the terminal device can flexibly adapt to a variety of communication needs.

Figure 17:
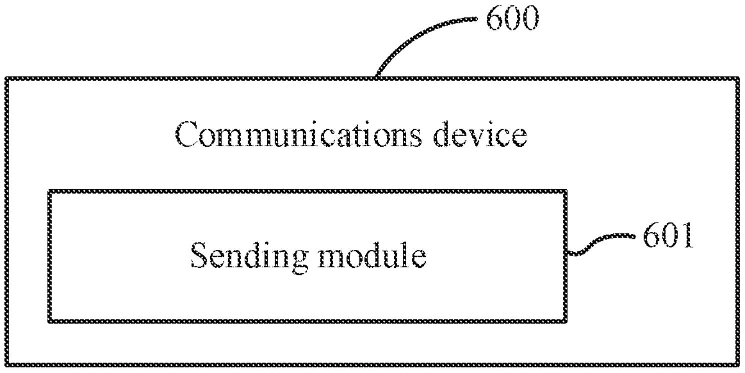
FIG. 17 is a schematic structural diagram of a communications device according to an embodiment of this application.

As shown in FIG. 17, an embodiment of this application provides a communications device 600. The communications device 600 includes:

a sending module 601, configured to send resource configuration information to a target terminal device, where the resource configuration information is used for determining, by the target terminal device, a sidelink feedback resource corresponding to a target mapping mode, and the target mapping mode is one of multiple mapping modes corresponding to one resource pool.

In the communications device 600 in this embodiment of this application, the sidelink feedback resources in corresponding to different mapping modes in the multiple mapping modes partially overlap or do not overlap at all in frequency domain.

In the communications device 600 in this embodiment of this application, the resource configuration information includes at least one of the following: feedback resource signaling, a frequency domain offset, or a resource indication value.

In the communications device 600 in this embodiment of this application, the feedback resource signaling includes first feedback resource signaling, where the first feedback resource signaling is used for determining a sidelink feedback resource corresponding to at least one of the multiple mapping modes, and the at least one mapping mode includes the target mapping mode.

In the communications device 600 in this embodiment of this application, the feedback resource signaling includes second feedback resource signaling and third feedback resource signaling. The second feedback resource signaling is used for determining a sidelink feedback resource corresponding to at least one of the multiple mapping modes, and the at least one mapping mode does not include the target mapping mode. The third feedback resource signaling is used for determining a sidelink feedback resource corresponding to the target mapping mode.

In the communications device 600 in this embodiment of this application, the frequency-domain offset is used for performing frequency-domain shifting on a first sidelink feedback resource by the target terminal device based on a frequency shift reference point, to obtain the sidelink feedback resource corresponding to the target mapping mode, where the at least one sidelink feedback resource partially overlaps or does not overlap at all.

In the communications device 600 in this embodiment of this application, the frequency shift reference point includes one of the following: a starting point of resource blocks RBs spanned by a sidelink feedback resource; an ending point of the RBs spanned by the sidelink feedback resource; a starting point of a bandwidth part BWP; an ending point of the BWP; a starting point of a resource pool; an ending point of the resource pool; a starting point corresponding to bits being set to a first value in a bitmap; or an ending point corresponding to the bits being set to the first value in the bitmap.

In the communications device 600 in this embodiment of this application, the resource indication value is one or more in quantity.

In the communications device 600 in this embodiment of this application, the resource indication value may include a first resource indication value and a second resource indication value. The first resource indication value and the second resource indication value are used for determining the sidelink feedback resource corresponding to the target mapping mode by the target terminal device.

In the communications device 600 in this embodiment of this application, the first resource indication value is used for determining, by the target terminal device, a first resource parameter of a sidelink feedback resource corresponding to a first mapping mode in the multiple mapping modes; and the second resource indication value is used to indicate a second resource parameter of the sidelink feedback resource, where the first resource parameter and the second resource parameter are used for determining, by the target terminal device, the sidelink feedback resource corresponding to the target mapping mode.

In the communications device 600 in this embodiment of this application, in a case that the number of resources in a sidelink feedback resource corresponding to a second mapping mode in the multiple mapping modes is the same as the number of resources in a sidelink feedback resource corresponding to a third mapping mode in the multiple mapping modes, the number of resources in a resource set corresponding to the second mapping mode and the number of resources in a resource set corresponding to the third mapping mode satisfy one of the following:

if a first feedback period corresponding to the second mapping mode is smaller than a second feedback period corresponding to the third mapping mode, the number of resources in the resource set corresponding to the third mapping mode is less than the number of resources in the resource set corresponding to the second mapping mode; if the first feedback period is larger than the second feedback period, the number of resources in the resource set corresponding to the third mapping mode is greater than the number of resources in the resource set corresponding to the second mapping mode; and if the first feedback period is equal to the second feedback period, the number of resources in the resource set corresponding to the third mapping mode is equal to the number of resources in the resource set corresponding to the second mapping mode; where the second mapping mode and the third mapping mode are any two different mapping modes of the multiple mapping modes, and the resource set is associated with time-frequency resources corresponding to a preset slot and a preset subchannel.

In the communications device 600 in this embodiment of this application, in a case that the number of resources in a resource set corresponding to a fourth mapping mode in the multiple mapping modes is the same as the number of resources in a resource set corresponding to a fifth mapping mode in the multiple mapping modes, the number of resources in a sidelink feedback resource corresponding to the fourth mapping mode and the number of resources in a sidelink feedback resource corresponding to the fifth mapping mode satisfy one of the following:

if a third feedback period corresponding to the fourth mapping mode is smaller than a fourth feedback period corresponding to the fifth mapping mode, the number of resources in the sidelink feedback resource corresponding to the fifth mapping mode is greater than the number of resources in the sidelink feedback resource corresponding to the fourth mapping mode; if the third feedback period is larger than the fourth feedback period, the number of resources in the sidelink feedback resource corresponding to the fifth mapping mode is less than the number of resources in the sidelink feedback resource corresponding to the fourth mapping mode; and if the third feedback period is equal to the fourth feedback period, the number of resources in the sidelink feedback resource corresponding to the fifth mapping mode is equal to the number of resources in the sidelink feedback resource corresponding to the fourth mapping mode; where the fourth mapping mode and the fifth mapping mode are any two different mapping modes of the multiple mapping modes, and the sidelink feedback resource is associated with time-frequency resources corresponding to a preset slot and a preset subchannel.

In the communications device 600 in this embodiment of this application, the determining module 601 may be further configured to determine a time-domain offset; and the sending module 603 may be further configured to send the time-domain offset to the target terminal device, where the time-domain offset is used for performing time-domain shifting on a sixth mapping mode in the multiple mapping modes by the target terminal device. A time domain resource corresponding to a seventh mapping mode in the multiple mapping modes and a time domain resource corresponding to the sixth mapping mode obtained through time-domain shifting satisfy a target position relationship In the communications device 600 in this embodiment of this application, the target position relationship includes one of the following: even-numbered slots corresponding to the sixth mapping mode obtained through time-domain shifting are aligned with even-numbered slots corresponding to the seventh mapping mode; even-numbered slots corresponding to the sixth mapping mode obtained through time-domain shifting are aligned with odd-numbered slots corresponding to the seventh mapping mode; or a slot starting point corresponding to the sixth mapping mode obtained through time-domain shifting is aligned with a slot starting point corresponding to the seventh mapping mode.

In the communications device 600 in this embodiment of this application, the determining module 601 may be further configured to determine at least one of a resource period or a feedback delay of the sidelink feedback resource corresponding to the target mapping mode; and the sending module 603 may be further configured to send, to the target terminal device, at least one of the resource period or feedback delay of the sidelink feedback resource corresponding to the target mapping mode.

It can be understood that the communications device 600 provided in this embodiment of this application is capable of implementing the sidelink feedback resource configuration method performed by the communications device 600. Related descriptions about configuration of sidelink feedback resources are all applicable to communications device 600, and details are not repeated herein.

In this embodiment of this application, the resource configuration information is provided for the target terminal device using sidelink, so that the target terminal device can determine, based on the resource configuration information, a sidelink feedback resource corresponding to a target mapping mode required for sidelink feedback, where the target mapping mode is one of multiple mapping modes corresponding to one resource pool. In this way, according to this embodiment of this application, terminal devices can have consistent understanding on sidelink feedback resource configuration, so as to implement coexistence of mapping modes with different feedback periods, thereby avoiding conflicts of sidelink feedback resources. Further, the terminal devices can support configuration of multiple mapping modes for one resource pool, and the terminal devices configured with different mapping modes can communicate with each other. In addition, the terminal devices can be also supported to perform sidelink feedback by using a most appropriate feedback period under different communication requirements, so as to achieve the purposes of adjusting communication reliability and feedback delay and implementing power saving. In this way, the terminal device can flexibly adapt to a variety of communication needs.

Figure 18:
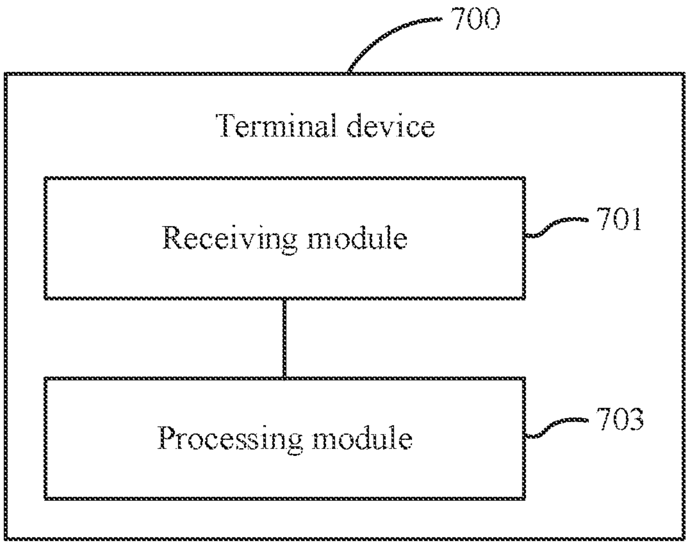
FIG. 18 is a schematic structural diagram of another terminal device according to an embodiment of this application.

Referring to FIG. 18, an embodiment of this application provides a terminal device 700. The terminal device 700 is a first terminal device and includes a receiving module 701 and a processing module 703.

The receiving module 701 is configured to receive at least one of a resource period or a feedback delay that are corresponding to a target sidelink feedback resource and sent by a second terminal device; and the processing module 703 is configured to perform at least one of the following operations based on at least one of the resource period or the feedback delay corresponding to the target sidelink feedback resource: determining a mapping mode of the first terminal device; determining a mapping mode of the second terminal device; and scheduling or recommending a sidelink feedback resource for the second terminal device.

In the terminal device 700 in this embodiment of this application, at least one of the resource period or the feedback delay corresponding to the target sidelink feedback resource is indicated by a target object; and the target object includes at least one of the following: sidelink control information SCI, SCI format, media access control MAC control element CE, MAC protocol data unit PDU, PC5 radio resource control RRC request, or connection establishment message.

In the terminal device 700 in this embodiment of this application, the target object is used to indicate at least one of the following:

a value of the resource period; an index corresponding to the resource period; a bitmap corresponding to the resource period; a value of the feedback delay; an index corresponding to the feedback delay; or a bitmap corresponding to the feedback delay.

It can be understood that the terminal device 700 provided in this embodiment of this application is capable of implementing the information processing method performed by the terminal device 700. Related descriptions about the information processing method are all applicable to the terminal device 700, and details are not repeated herein.

In this embodiment of this application, the first terminal device may determine a mapping mode of at least one of the two terminal devices based on at least one of the resource period N or the feedback delay k that are corresponding to the target sidelink feedback resource and provided by the second terminal device, so that the at least one of the two terminal devices can smoothly implement feedback of HARQ information based on the determined mapping mode; and/or schedules or recommends a sidelink feedback resource for the second terminal device based on N and/or k, thereby improving efficiency of the second terminal device in determining an appropriate resource.

Figure 19:
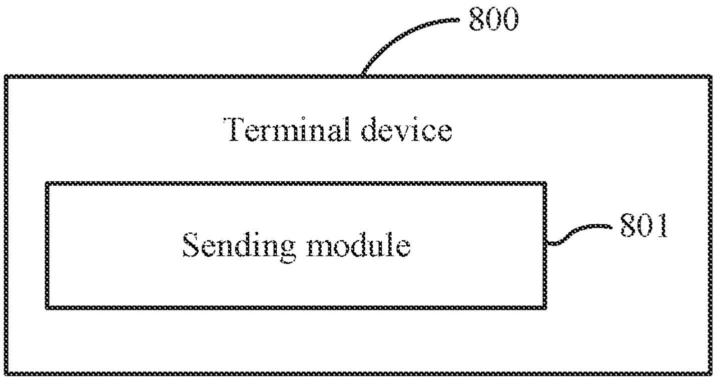
FIG. 19 is a schematic structural diagram of still another terminal device according to an embodiment of this application.

As shown in FIG. 19, an embodiment of this application provides a terminal device 800. The terminal device 800 is a second terminal device, including:

a sending module 801, configured to send, to a first terminal device, at least one of a resource period or a feedback delay that are corresponding to a target sidelink feedback resource, where the at least one of the resource period or the feedback delay corresponding to the target sidelink feedback resource is used for performing at least one of the following operations by the first terminal device: determining a mapping mode of the first terminal device; determining a mapping mode of the second terminal device; or scheduling or recommending a resource for the second terminal device.

In the terminal device 800 in this embodiment of this application, at least one of the resource period or the feedback delay corresponding to the target sidelink feedback resource is indicated by a target object; and the target object includes at least one of the following: sidelink control information SCI, SCI format, media access control MAC control element CE, MAC protocol data unit PDU, PC5 radio resource control RRC request, or connection establishment message.

In the terminal device 800 in this embodiment of this application, the target object is used to indicate at least one of the following:

a value of the resource period; an index corresponding to the resource period; a bitmap corresponding to the resource period; a value of the feedback delay; an index corresponding to the feedback delay; or a bitmap corresponding to the feedback delay.

It can be understood that the terminal device 800 provided in this embodiment of this application is capable of implementing the information processing method performed by the terminal device 800. Related descriptions about the information processing method are all applicable to the terminal device 800, and details are not repeated herein.

In this embodiment of this application, the second terminal device may provide the first terminal device with at least one of the resource period N or the feedback delay k corresponding to the target sidelink feedback resource, so that the first terminal device can determine a mapping mode of at least one of the two terminal devices based on N and/or k and the at least one of the two terminal devices can smoothly implement feedback of HARQ information based on the determined mapping mode; and/or so that the first terminal device schedules or recommends a sidelink feedback resource for the second terminal device based on N and/or k, thereby improving efficiency of the second terminal device in determining an appropriate resource.

Figure 20:
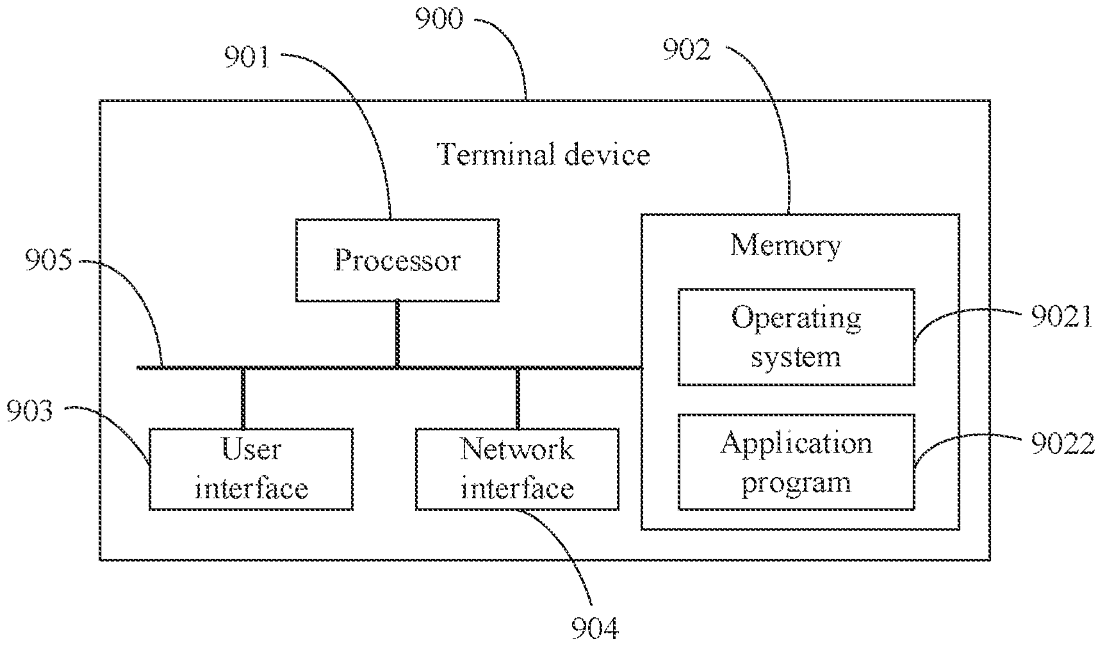
FIG. 20 is a schematic structural diagram of yet another terminal device according to an embodiment of this application.

FIG. 20 is a block diagram of a terminal device according to another embodiment of this application. The terminal device 900 shown in FIG. 20 includes at least one processor 901, a memory 902, at least one network interface 904, and a user interface 903. The components in the terminal device 900 are coupled together through a bus system 905. It can be understood that the bus system 905 is used to implement a connection and communication between these components. In addition to a data bus, the bus system 905 further includes a power bus, a control bus, and a status signal bus. However, for clarity of description, various buses are marked as the bus system 905 in FIG. 20.

The user interface 903 may include a display, a keyboard, a click device (for example, a mouse or a trackball), a touch board, or a touchscreen.

It can be understood that the memory 902 in this embodiment of this application may be a volatile memory or a non-volatile memory, or may include both a volatile memory and a non-volatile memory. The non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As exemplary rather than restrictive description, many forms of RAM can be used, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), and a Direct Rambus RAM (DRRAM). The memory 902 in the system and method described in this embodiment of this application is intended to include but is not limited to these and any other suitable types of memories.

In some implementations, the memory 902 stores the following elements: an executable module or a data structure, or a subset thereof, or an extended set thereof: an operating system 9021 and an application program 9022.

The operating system 9021 includes various system programs, such as a framework layer, a core library layer, and a driver layer, for implementing various basic services and processing hardware-based tasks. The application program 9022 includes various application programs, such as a media player and a browser, which are used to implement various application services. A program for implementing the method in this embodiment of this application may be included in the application program 9022.

In this embodiment of this application, the terminal device 900 further includes: a program or instructions stored in the memory 902 and capable of running on the processor 901.

In some embodiments, when the program or instructions are executed by the processor 901, the following steps may be implemented:

obtaining resource configuration information; and determining, based on the resource configuration information, a sidelink feedback resource corresponding to a target mapping mode, where the target mapping mode is one of multiple mapping modes corresponding to one resource pool.

In this embodiment of this application, the terminal device using sidelink may determine, based on the obtained resource configuration information, a sidelink feedback resource corresponding to a target mapping mode required for sidelink feedback, where the target mapping mode is one of multiple mapping modes corresponding to one resource pool. In this way, according to this embodiment of this application, terminal devices can have consistent understanding on sidelink feedback resource configuration, so as to implement coexistence of mapping modes with different feedback periods, thereby avoiding conflicts of sidelink feedback resources. Further, the terminal devices can support configuration of multiple mapping modes for one resource pool, and the terminal devices configured with different mapping modes can communicate with each other. In addition, the terminal devices can be also supported to perform sidelink feedback by using a most appropriate feedback period under different communication requirements, so as to achieve the purposes of adjusting communication reliability and feedback delay and implementing power saving. In this way, the terminal device can flexibly adapt to a variety of communication needs.

In some embodiments, when the program or instructions are executed by the processor 901, the following steps may be further implemented:

receiving at least one of a resource period or a feedback delay that are corresponding to a target sidelink feedback resource and sent by a second terminal device; and performing at least one of the following operations based on at least one of the resource period or the feedback delay corresponding to the target sidelink feedback resource: determining a mapping mode of the first terminal device; determining a mapping mode of the second terminal device; or scheduling or recommending a resource for the second terminal device.

In this embodiment of this application, the first terminal device may determine a mapping mode of at least one of the two terminal devices based on at least one of the resource period N or the feedback delay k that are corresponding to the target sidelink feedback resource and provided by the second terminal device, so that the at least one of the two terminal devices can smoothly implement feedback of HARQ information based on the determined mapping mode; and/or schedules or recommends a sidelink feedback resource for the second terminal device based on N and/or k, thereby improving efficiency of the second terminal device in determining an appropriate resource.

In some embodiments, when the program or instructions are executed by the processor 901, the following steps may be further implemented:

sending, to a first terminal device, at least one of a resource period or a feedback delay that are corresponding to a target sidelink feedback resource, where the at least one of the resource period and the feedback delay corresponding to the target sidelink feedback resource is used for performing at least one of the following operations by the first terminal device: determining a mapping mode of the first terminal device; determining a mapping mode of the second terminal device; or scheduling or recommending a resource for the second terminal device.

In this embodiment of this application, the second terminal device may provide the first terminal device with at least one of the resource period N or the feedback delay k corresponding to the target sidelink feedback resource, so that the first terminal device can determine a mapping mode of at least one of the two terminal devices based on N and/or k and the at least one of the two terminal devices can smoothly implement feedback of HARQ information based on the determined mapping mode; and/or so that the first terminal device schedules or recommends a sidelink feedback resource for the second terminal device based on N and/or k, thereby improving efficiency of the second terminal device in determining an appropriate resource.

The method disclosed in the foregoing embodiments of this application may be applied to the processor 901 or implemented by the processor 901. The processor 901 may be an integrated circuit chip, having a signal processing capability. During implementation, the steps of the foregoing method can be completed by hardware integrated logic circuits in the processor 901 or instructions in the form of software. The foregoing processor 901 may be a general-purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The processor 901 may implement or execute the methods, steps, and logical block diagrams disclosed in the embodiments of this application. The general-purpose processor may be a microprocessor, or the processor may also be any conventional processor or the like. The steps of the methods disclosed with reference to the embodiments of this application may be directly implemented by a hardware decoding processor, or may be implemented by a combination of hardware and software modules in a decoding processor. The software module may be located in a computer-readable storage medium that is mature in the art, such as a random access memory, a flash memory, a read-only memory, a programmable read-only memory or an electrically erasable programmable memory, or a register. The computer-readable storage medium is located in the memory 902, and the processor 901 fetches information in the memory 902, and completes the steps of the foregoing method in combination with its hardware. In some embodiments, a computer program is stored in the computer-readable storage medium, and when the computer program is executed by the processor 901, the steps of the foregoing embodiments of the sidelink feedback resource configuration method are implemented, or when the computer program is executed by the processor 901, the steps of the foregoing embodiments of the information processing method are implemented.

It can be understood that the embodiments described in this application may be implemented by hardware, software, firmware, middleware, microcode, or a combination thereof. For hardware implementation, the processing unit may be implemented in one or more Application Specific Integrated Circuits (ASIC), a Digital Signal Processing (DSP), a DSP Device (DSPD), a Programmable Logic Device (PLD), a Field-Programmable Gate Array (FPGA), a general-purpose processor, a controller, a microcontroller, a microprocessor, another electronic unit for performing the functions described in this application, or a combination thereof.

For software implementation, the technologies described in the embodiments of this application may be implemented by modules (for example, processes or functions) that perform the functions described in the embodiments of this application. Software code may be stored in the memory and executed by the processor. The memory may be implemented in or outside the processor.

The terminal device 900 is capable of implementing the processes implemented by the terminal device in the foregoing embodiments. To avoid repetition, details are not described herein again.

An embodiment of this application further provides a terminal device, including a memory, a processor, and a program or instructions stored in the memory and capable of running on the processor, and when the program or instructions are executed by the processor, the processes of the foregoing embodiments of the sidelink feedback resource configuration method applicable to the terminal device are implemented, or when the program or instructions are executed by the processor, the processes of the foregoing embodiments of the information processing method applied to the first terminal device or the second terminal device are implemented, with the same or equivalent technical effects achieved. To avoid repetition, details are not described herein again.

An embodiment of this application further provides a readable storage medium, where a program or instructions are stored in the readable storage medium. When the program or the instructions are executed by a processor, the processes of the foregoing embodiments of the sidelink feedback resource configuration method applicable to the terminal device are implemented, or when the program or instructions are executed by the processor, the processes of the foregoing embodiments of the information processing method applied to the first terminal device or the second terminal device are implemented, with the same or equivalent technical effects achieved. To avoid repetition, details are not described herein again.

The processor is a processor in the network device described in the foregoing embodiments. The readable storage medium includes a computer-readable storage medium, for example, a computer Read-Only Memory (ROM), a Random Access Memory (RAM), a magnetic disk, or an optical disc.

Figure 21:
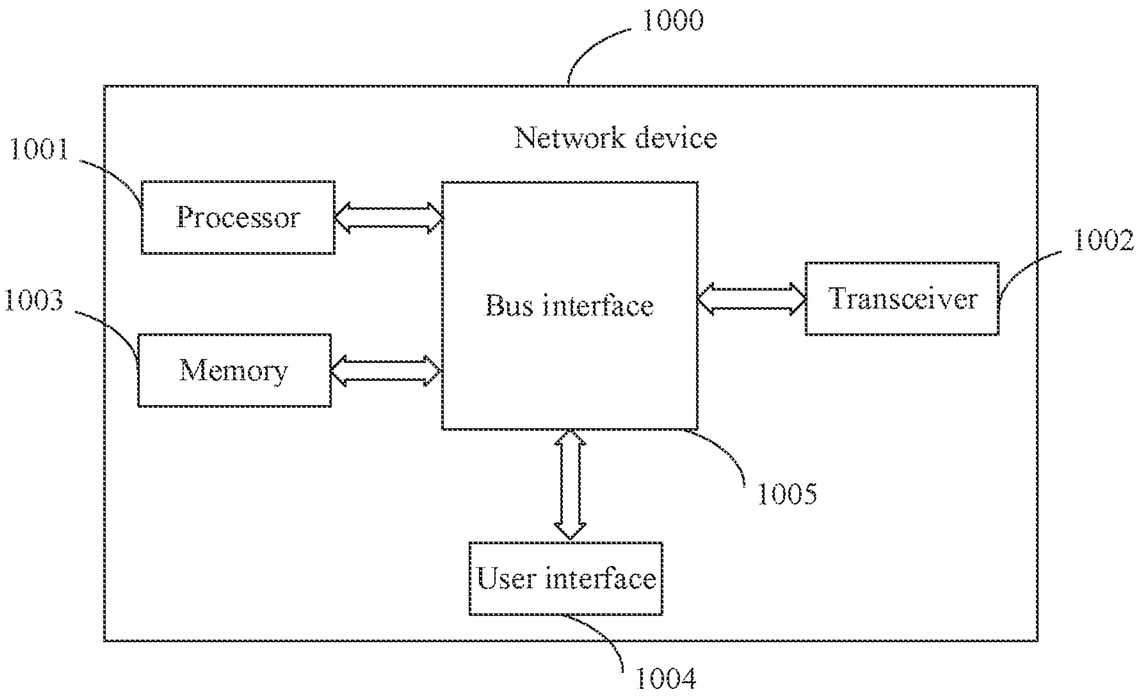
FIG. 21 is a schematic structural diagram of a network device according to an embodiment of this application.

Referring to FIG. 21, FIG. 21 is a structural diagram of a network device to which the embodiments of this application are applied. Details of the sidelink feedback resource configuration method can be implemented to achieve the same effects. As shown in FIG. 21, the network device 1000 includes a processor 1001, a transceiver 1002, a memory 1003, a user interface 1004, and a bus interface 1005.

In this embodiment of this application, the network device 1000 further includes: a program or instructions stored in the memory 1003 and capable of running on the processor 1001. When the program or the instructions are executed by the processor 1001, the following steps are implemented:

sending resource configuration information to a target terminal device, where the resource configuration information is used for determining, by the target terminal device, a sidelink feedback resource corresponding to a target mapping mode, and the target mapping mode is one of multiple mapping modes corresponding to one resource pool.

In this embodiment of this application, the resource configuration information is provided for the target terminal device using sidelink, so that the target terminal device can determine, based on the resource configuration information, a sidelink feedback resource corresponding to a target mapping mode required for sidelink feedback, where the target mapping mode is one of multiple mapping modes corresponding to one resource pool. In this way, according to this embodiment of this application, terminal devices can have consistent understanding on sidelink feedback resource configuration, so as to implement coexistence of mapping modes with different feedback periods, thereby avoiding conflicts of sidelink feedback resources. Further, the terminal devices can support configuration of multiple mapping modes for one resource pool, and the terminal devices configured with different mapping modes can communicate with each other. In addition, the terminal devices can be also supported to perform sidelink feedback by using a most appropriate feedback period under different communication requirements, so as to achieve the purposes of adjusting communication reliability and feedback delay and implementing power saving. In this way, the terminal device can flexibly adapt to a variety of communication needs.

In FIG. 21, a bus architecture may include any quantity of interconnected buses and bridges, for example, for interconnecting various circuits of one or more processors represented by the processor 1001 and a memory represented by the memory 1003. The bus architecture may further link together various other circuits, such as a peripheral device, a voltage regulator, and a power management circuit, which are well known in the art and therefore are not further described herein. The bus interface 1005 provides an interface. The transceiver 1002 may be a plurality of elements, including a transmitter and a receiver, and provides units for communicating with a variety of other apparatuses over a transmission medium. For different user equipment, the user interface 1004 may also be an interface that can be externally or internally connected to a required device, and the connected device includes but is not limited to a keypad, a display, a speaker, a microphone, and a joystick.

The processor 1001 is responsible for managing the bus architecture and general processing, and the memory 1003 may store data used by the processor 1001 when performing an operation.

An embodiment of this application further provides an electronic device, including a processor, a memory, and a program or instructions stored in the memory and capable of running on the processor. When the program or the instructions are executed by the processor, the processes of the foregoing embodiments of the sidelink feedback resource configuration method are implemented, with the same technical effects achieved. To avoid repetition, details are not described herein again.

An embodiment of this application further provides a readable storage medium, where a program or instructions are stored in the readable storage medium. When the program or instructions are executed by a processor, the processes of the foregoing embodiments of the sidelink feedback resource configuration method applied to the network device can be implemented, with the same technical effects achieved. To avoid repetition, details are not described herein again.

The processor is a processor in the network device described in the foregoing embodiments. The readable storage medium includes a computer-readable storage medium, for example, a computer Read-Only Memory (ROM), a Random Access Memory (RAM), a magnetic disk, or an optical disc.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus. In the absence of more restrictions, an element preceded by the statement "includes a . . . " does not preclude the existence of other identical elements in the process, method, article, or apparatus that includes the element. In addition, it should be noted that the scopes of the method and apparatus in the implementations of this application are not limited to performing functions in the sequence shown or discussed, and may further include performing functions at substantially the same time or in a reverse sequence according to the involved functions. For example, the described method may be performed in a sequence different from the described sequence, and steps may be added, omitted, or combined. In addition, features described with reference to some examples may be combined in other examples.

By means of the foregoing description of the implementations, a person skilled in the art may clearly understand that the method in the foregoing embodiments may be implemented by software with a necessary general hardware platform. The method in the foregoing embodiments may be implemented by hardware. Based on such an understanding, the technical solutions of this application essentially or a part thereof that contributes to the prior art may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing specific implementations. The foregoing specific implementations are merely illustrative rather than restrictive. As instructed by this application, a person of ordinary skill in the art may develop many other manners without departing from the essence of this application and the protection scope of the claims, and all such manners shall fall within the protection scope of this application.

What is claimed is:

1. A method for sidelink feedback resource configuration, performed by a terminal device, comprising:

receiving, through a transceiver, resource configuration information transmitted by a communications device, wherein the resource configuration information comprises feedback resource signaling, the feedback resource signaling comprises second feedback resource signaling and third feedback resource signaling; and determining, based on the resource configuration information, a sidelink feedback resource corresponding to a target mapping mode, wherein the target mapping mode is one of multiple mapping modes corresponding to one resource pool, wherein both the second feedback resource signaling and the third feedback resource signaling are bitmaps;

the second feedback resource signaling is used for determining a sidelink feedback resource corresponding to at least one mapping mode among the multiple mapping modes, and the at least one mapping mode does not comprise the target mapping mode; and the third feedback resource signaling is used for determining the sidelink feedback resource corresponding to the target mapping mode.

2. The method according to claim 1, wherein sidelink feedback resources corresponding to different mapping modes in the multiple mapping modes partially overlap or do not overlap at all in frequency domain.

3. The method according to claim 1, wherein the resource configuration information further comprises at least one of the following:

a frequency-domain offset; or a resource indication value.

4. The method according to claim 3, wherein the feedback resource signaling comprises first feedback resource signaling, the first feedback resource signaling is used for determining a sidelink feedback resource corresponding to at least one of the multiple mapping modes, and the at least one mapping mode comprises the target mapping mode.

5. The method according to claim 3, wherein the determining, based on the resource configuration information, a sidelink feedback resource corresponding to a target mapping mode comprises:

performing frequency-domain shifting on a first sidelink feedback resource based on the frequency-domain offset and a frequency shift reference point, so as to obtain the sidelink feedback resource corresponding to the target mapping mode.

6. The method according to claim 5, wherein the frequency shift reference point comprises one of the following:

a starting point of resource blocks (RBs) spanned by a sidelink feedback resource;

an ending point of the RBs spanned by the sidelink feedback resource;

a starting point of a bandwidth part (BWP);

an ending point of the BWP;

a starting point of a resource pool;

an ending point of the resource pool;

a starting point corresponding to bits being set to a first value in a bitmap; or an ending point corresponding to the bits being set to the first value in the bitmap.

7. The method according to claim 3, wherein the resource indication value comprises a first resource indication value and a second resource indication value; and the determining, based on the resource configuration information, a sidelink feedback resource corresponding to a target mapping mode comprises:

determining, based on the first resource indication value and the second resource indication value, the sidelink feedback resource corresponding to the target mapping mode.

8. The method according to claim 3, wherein when the number of resources in a sidelink feedback resource corresponding to a second mapping mode in the multiple mapping modes is the same as the number of resources in a sidelink feedback resource corresponding to a third mapping mode in the multiple mapping modes, the number of resources in a resource set corresponding to the second mapping mode and the number of resources in a resource set corresponding to the third mapping mode satisfy one of the following:

responsive to determining that a first feedback period corresponding to the second mapping mode is smaller than a second feedback period corresponding to the third mapping mode, the number of resources in the resource set corresponding to the third mapping mode is less than the number of resources in the resource set corresponding to the second mapping mode;

responsive to determining that the first feedback period is larger than the second feedback period, the number of resources in the resource set corresponding to the third mapping mode is greater than the number of resources in the resource set corresponding to the second mapping mode; or responsive to determining that the first feedback period is equal to the second feedback period, the number of resources in the resource set corresponding to the third mapping mode is equal to the number of resources in the resource set corresponding to the second mapping mode, wherein the second mapping mode and the third mapping mode are any two different mapping modes of the multiple mapping modes, and the resource set is associated with time-frequency resources corresponding to a preset slot and a preset subchannel.

9. The method according to claim 3, wherein when the number of resources in a resource set corresponding to a fourth mapping mode in the multiple mapping modes is the same as the number of resources in a resource set corresponding to a fifth mapping mode in the multiple mapping modes, the number of resources in a sidelink feedback resource corresponding to the fourth mapping mode and the number of resources in a sidelink feedback resource corresponding to the fifth mapping mode satisfy one of the following:

responsive to determining that a third feedback period corresponding to the fourth mapping mode is smaller than a fourth feedback period corresponding to the fifth mapping mode, the number of resources in the sidelink feedback resource corresponding to the fifth mapping mode is greater than the number of resources in the sidelink feedback resource corresponding to the fourth mapping mode;

responsive to determining that the third feedback period is larger than the fourth feedback period, the number of resources in the sidelink feedback resource corresponding to the fifth mapping mode is less than the number of resources in the sidelink feedback resource corresponding to the fourth mapping mode; or responsive to determining that the third feedback period is equal to the fourth feedback period, the number of resources in the sidelink feedback resource corresponding to the fifth mapping mode is equal to the number of resources in the sidelink feedback resource corresponding to the fourth mapping mode, wherein the fourth mapping mode and the fifth mapping mode are any two different mapping modes of the multiple mapping modes, and the sidelink feedback resource is associated with time-frequency resources corresponding to a preset slot and a preset subchannel.

10. The method according to claim 1, further comprising:

obtaining a time-domain offset; and performing time-domain shifting on a sixth mapping mode in the multiple mapping modes based on the time-domain offset, wherein a time domain resource corresponding to a seventh mapping mode in the multiple mapping modes and a time domain resource corresponding to the sixth mapping mode obtained through time-domain shifting satisfy a target position relationship.

11. The method according to claim 10, wherein the target position relationship comprises one of the following:

even-numbered slots corresponding to the sixth mapping mode obtained through time-domain shifting are aligned with even-numbered slots corresponding to the seventh mapping mode;

even-numbered slots corresponding to the sixth mapping mode obtained through time-domain shifting are aligned with odd-numbered slots corresponding to the seventh mapping mode; or a starting point of a slot corresponding to the sixth mapping mode obtained through time-domain shifting is aligned with a starting point of a slot corresponding to the seventh mapping mode.

12. The method according to claim 1, wherein value 1 in the bitmaps indicates that a corresponding position is a Physical Sidelink Feedback Channel (PSFCH) resource, and value 0 indicates that a corresponding position is not a PSFCH resource.

13. A method for sidelink feedback resource configuration, performed by a communications device, comprising:

transmitting, through a transceiver, resource configuration information to a target terminal device, wherein:

the resource configuration information comprises feedback resource signaling, the feedback resource signaling comprises second feedback resource signaling and third feedback resource signaling; and the resource configuration information is used for determining, by the target terminal device, a sidelink feedback resource corresponding to a target mapping mode, and the target mapping mode is one of multiple mapping modes corresponding to one resource pool, wherein both the second feedback resource signaling and the third feedback resource signaling are bitmaps;

the second feedback resource signaling is used for determining a sidelink feedback resource corresponding to at least one mapping mode among the multiple mapping modes, and the at least one mapping mode does not comprise the target mapping mode; and the third feedback resource signaling is used for determining the sidelink feedback resource corresponding to the target mapping mode.

14. The method according to claim 13, wherein sidelink feedback resources corresponding to different mapping modes in the multiple mapping modes partially overlap or do not overlap at all in frequency domain.

15. The method according to claim 13, wherein the resource configuration information further comprises at least one of the following:

a frequency-domain offset; or a resource indication value.

16. The method according to claim 15, wherein the frequency-domain offset is used for performing frequency-domain shifting on a first sidelink feedback resource by the target terminal device based on a frequency shift reference point, to obtain the sidelink feedback resource corresponding to the target mapping mode.

17. The method according to claim 16, wherein the frequency shift reference point comprises one of the following:

a starting point of resource blocks (RBs) spanned by a sidelink feedback resource;

an ending point of the RBs spanned by the sidelink feedback resource;

a starting point of a bandwidth part (BWP);

an ending point of the BWP;

a starting point of a resource pool;

an ending point of the resource pool;

a starting point corresponding to bits being set to a first value in a bitmap; or an ending point corresponding to the bits being set to the first value in the bitmap.

18. The method according to claim 15, wherein the resource indication value comprises a first resource indication value and a second resource indication value; and the first resource indication value and the second resource indication value are used for determining, by the target terminal device, the sidelink feedback resource corresponding to the target mapping mode.

19. The method according to claim 18, wherein the first resource indication value is used for determining, by the target terminal device, a first resource parameter of a sidelink feedback resource corresponding to a first mapping mode in the multiple mapping modes; and the second resource indication value is used to indicate a second resource parameter of the sidelink feedback resource, wherein the first resource parameter and the second resource parameter are used for determining, by the target terminal device, the sidelink feedback resource corresponding to the target mapping mode.

20. A terminal device, comprising:

a memory storing a computer program; and a processor coupled to the memory and configured to execute the computer program to perform operations comprising:

receiving, through a transceiver, resource configuration information transmitted by a communications device, wherein the resource configuration information comprises feedback resource signaling, the feedback resource signaling comprises second feedback resource signaling and third feedback resource signaling; and determining, based on the resource configuration information, a sidelink feedback resource corresponding to a target mapping mode, wherein the target mapping mode is one of multiple mapping modes corresponding to one resource pool, wherein both the second feedback resource signaling and the third feedback resource signaling are bitmaps;

the second feedback resource signaling is used for determining a sidelink feedback resource corresponding to at least one mapping mode among the multiple mapping modes, and the at least one mapping mode does not comprise the target mapping mode; and the third feedback resource signaling is used for determining the sidelink feedback resource corresponding to the target mapping mode.

* * * * *